(12) United States Patent
Gates et al.

(10) Patent No.: US 12,503,724 B2
(45) Date of Patent: Dec. 23, 2025

(54) SELECTIVE COVALENT CAPTURE OF A DNA SEQUENCE

(71) Applicant: The Curators of the University of Missouri, Columbia, MO (US)

(72) Inventors: Kent Gates, Columbia, MO (US); Li-Qun Gu, Columbia, MO (US); Maryam Imani Nejad, Columbia, MO (US); Xu Guo, Columbia, MO (US)

(73) Assignee: The Curators of the University of Missouri, Columbia, MO (US)

( * ) Notice: Subject to any disclaimer, the term of this patent is extended or adjusted under 35 U.S.C. 154(b) by 920 days.

(21) Appl. No.: 17/633,746

(22) PCT Filed: Aug. 10, 2020

(86) PCT No.: PCT/US2020/045632
§ 371 (c)(1),
(2) Date: Feb. 8, 2022

(87) PCT Pub. No.: WO2021/030275
PCT Pub. Date: Feb. 18, 2021

(65) Prior Publication Data
US 2022/0333164 A1  Oct. 20, 2022

Related U.S. Application Data

(60) Provisional application No. 62/884,867, filed on Aug. 9, 2019.

(51) Int. Cl.
C12Q 1/68 (2018.01)
C07H 21/04 (2006.01)
(Continued)

(52) U.S. Cl.
CPC ......... *C12Q 1/6816* (2013.01); *C12Q 1/6876* (2013.01); *G01N 33/50* (2013.01); *C12Q 2600/112* (2013.01)

(58) Field of Classification Search
None
See application file for complete search history.

(56) References Cited

U.S. PATENT DOCUMENTS 11,034,996 B2 * 6/2021 Gates .................. C12Q 1/6886
2002/0197623 A1 12/2002 Prudent et al.
(Continued)

FOREIGN PATENT DOCUMENTS

WO   2010/067874 A1   6/2010
WO   2013/102108 A2   7/2013

OTHER PUBLICATIONS

Zhang et al. (ASCNANO, vol. 9, No. 12, pp. 11812-11819, 2015). (Year: 2015).*

(Continued)

*Primary Examiner* — Jeanine A Goldberg
(74) *Attorney, Agent, or Firm* — Thompson Coburn LLP; William A. Holtz

(57) ABSTRACT

Provided herein are probes in which an Ap site of a probe strand can selectively cross-link with a 2'-deoxyguanosine (dG) of a target strand. Also provided for are methods of using such probes to generate and detect crosslinked molecules and methods of detecting disease associated genetic mutations.

17 Claims, 14 Drawing Sheets

Figure 1:
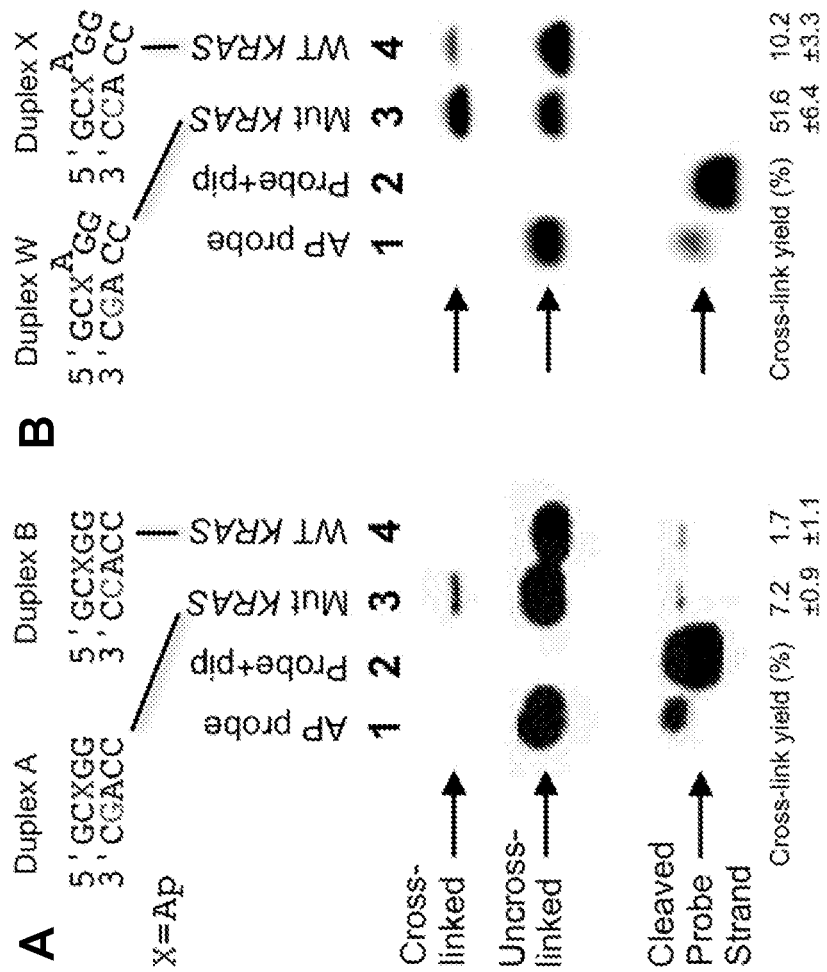

Specification includes a Sequence Listing.

(51) Int. Cl.
  C12Q 1/6816  (2018.01)
  C12Q 1/6876  (2018.01)
  G01N 33/50   (2006.01)

(56) References Cited

U.S. PATENT DOCUMENTS

2011/0183320 A1  7/2011  Flusberg et al.
2012/0252128 A1  10/2012 Lu et al.
2019/0271029 A1* 9/2019  Gates ............. C12Q 1/6827

OTHER PUBLICATIONS

Nejad et al. (Chem BioChem Communications, vol. 18, pp. 1383-1386, 2017). (Year: 2017).*
Johnson et al. (J. Am Chem Soc. vol. 135, No. 3, pp. 1015-1025, Jan. 2013 (Year: 2013).*
Guo et al., "Selective covalent capture of a DNA sequence corresponding to a cancer-driving C>G mutation in the KRAS gene by a chemically reactive probe: optimizing a cross-linking reaction with noncanonical duplex structures", RSC Advances, Oct. 2019, pp. 32804-32810, vol. 9, No. 56.
Sutherland et al., "Utility of Formaldehyde Cross-Linking and Mass Spectrometry in the Study of Protein-Protein Interactions", Journal of Mass Spectrometry, 2008, pp. 699-715, vol. 43, No. 6.
Takaoka et al., "Protein Organic Chemistry and Applications for Labeling and Engineering in Live-Cell Systems", Angewandte Chemie (International Edition in English), 2013, pp. 4088-4106, vol. 52, No. 15.
Tyagi et al., "Molecular Beacons: Probes that Fluoresce upon Hybridization", Nature Biotechnology, 1996, pp. 303-308, vol. 14, No. 3.
Varshney et al., "Specificities and Kinetics of Uracil Excision from Uracil-Containing DNA Oligomers by *Escherichia coli* Uracil DNA Glycosylase", Biochemistry, 1991, pp. 4055-4061, vol. 30, No. 16.
Vieregg et al., "Selective Nucleic Acid Capture with Shielded Covalent Probes", Journal of the American Chemical Society, 2013, pp. 9691-9699, vol. 135, No. 26.
Wang et al., "Modular Probes for Enriching and Detecting Complex Nucleic Acid Sequences", Nature Chemistry, 2017, pp. 1222-1228, vol. 9, No. 12.
Wetmur, "DNA Probes: Applications of the Principles of Nucleic Acid Hybridization", Critical Reviews in Biochemistry and Molecular Biology, 1991, pp. 227-259, vol. 26, No. 3/4.
Willems et al., "Current Developments in Activity-Based Protein Profiling", Bioconjugate Chemistry, 2014, pp. 1181-1191, vol. 25, No. 7.
Yu et al., "The Three-Dimensional Organization of Mammalian Genomes", Annual Review of Cell and Developmental Biology, 2017, pp. 265-289, vol. 33.
Zhang et al., "Characterization of Interstrand DNA-DNA Cross-Links Using the a-Hemolysin Protein Nanopore", ACS Nano, 2015, pp. 11812-11819, vol. 9, No. 12.
Alexandre et al., "Colorimetric Silver Detention of DNA Microarrays", Analytical Biochemistry, 2001, pp. 1-8, vol. 295, No. 1.
Borch et al., "A New Method for the Methylation of Amines", The Journal of Organic Chemistry, 1972, pp. 1673-1674, vol. 37, No. 10.
Borch et al., "The Cyanohydridoborate Anion as a Selective Reducing Agent", Journal of the American Chemical Society, 1971, pp. 2897-2904, vol. 93, No. 12.
Catalano et al., "Chemical Structure and Properties of Interstrand Cross-Links Formed by Reaction of Guanine Residues with Abasic Sites in Duplex DNA", Journal of the American Chemical Society, Mar. 25, 2015, pp. 3933-3945, vol. 135, No. 11.
Catalano et al., "Effective Molarity in a Nucleic Acid-Controlled Reaction", Bioorganic & Medicinal Chemistry Letters, 2016, pp. 2627-2630, vol. 26, No. 11.
Chen et al. "Chemical Tags: Inspiration for Advanced Imaging Techniques", Current Opinion in Chemical Biology, 2013, pp. 637-643, vol. 17, No. 4.

Cheng et al., "Detection of Rare Point Mutation via Allele-Specific Amplification in Emulsion PCR", BMB Reports, May 2013, pp. 270-275, vol. 46, No. 5.
Costes et al., "Psoralen-Modified Oligonucleotide Primers Improve Detection of Mutations by Denaturing Gradient Gel Electrophoresis and Provide an Alternative to GC-Clamping", Human Molecular Genetics, 1993, pp. 393-397, vol. 2, No. 4.
Cravatt et al., "Activity-Based Protein Profiling: From Enzyme Chemistry to Proteomic Chemistry", Annual Review of Biochemistry, 2008, pp. 383-414, vol. 77.
Demidov et al., "Two Sides of the Coin: Affinity and Specificity of Nucleic Acid Interactions", Trends in Biochemical Sciences, 2004, pp. 62-71, vol. 29, No. 2.
Durney et al., "Capillary Electrophoresis Applied to DNA: Determining and Harnessing Sequence and Structure to Advance Bioanalyses (2009-2014)", Analytical Bioanalytical Chemistry, 2015, pp. 6923-6938, vol. 407, No. 23.
Dutta et al., "Interstrand Crosslinks Generated by Abasic Sites in Duplex DNA", Journal of the American Chemical Society, 2007, pp. 1-9, vol. 129, No. 7.
Engreitz et al., "RNA-RNA Interactions Enable Specific Targeting of Noncoding RNAs to Nascent Pre-mRNAs and Chromatin Sites", Cell, 2014, pp. 188-199, vol. 159, No. 1.
Fujimoto et al. "Details of the Ultrafast DNA Photo-Cross-Linking Reaction of 3-Cyanovinylcarbazole Nucleoside: Cis-Trans Isomeric Effect and the Application for SNP-Based Genotyping", Journal of the American Chemical Society, 2013, pp. 16161-16167, vol. 135, No. 43.
Gunderson et al., "A Genome-Wide Scalable SNP Genotyping Assay Using Microarray Technology", Nature Genetics, 2005, pp. 549-554, vol. 37, No. 5.
Hartley et al., "Electrophoretic and Chromatographic Separation Methods Used to Reveal Interstrand Crosslinking of Nucleic Acids", Journal of Chromatography, 1993, pp. 277-288, vol. 618, No. 1-2.
Hattori et al., "Formation of Highly Selective and Efficient Interstrand Cross-Linking to Thymine without Photo-Irradiation", Chemical Communications, 2009, pp. 6463-6465, vol. 42.
Havre et al., "Targeted Mutagenesis of DNA Using Triple Helix-Forming Oligonucleotides Linked to Psoralen", Proceedings of the National Academy of Sciences of the United States of America, 1993, pp. 7879-7883, vol. 90.
Hoffman et al., "Formaldehyde Crosslinking: A Tool for the Study of Chromatin Complexes", The Journal of Biological Chemistry, 2015, pp. 26404-26411, vol. 290, No. 44.
Hu et al., "Fluorescence in Situ Hybridization (FISH): An Increasingly Demanded Tool for Biomarker Research and Personalized Medicine", Biomarker Research, 2014, pp. 1-13, vol. 2, No. 3.
John et al., "Mechanics of DNA Flexibility Visualized by Selective 2′—Amine Acylation at Nucleotide Bulges", Journal of Molecular Biology, 2004, pp. 611-619, vol. 337, No. 3.
Johnson et al., "On the Formation and Properties of Interstrand DNA-DNA Cross-links Forged by Reaction of an Abasic Site With the Opposing Guanine Residue 015′ -CAp Sequences in Duplex DNA", Journal of the American Chemical Society, Jan. 23, 2013, pp. 1015-1025, vol. 135, No. 3.
Karlin et al., "Applications and Statistics for Multiple High-Scoring Segments in Molecular Sequences", Proceedings of the National Academy of Sciences of the United States of America, 1993, pp. 5873-5877, vol. 90, No. 12.
Katsanis et al., "Molecular Genetic Testing and the Future of Clinical Genomics", Nature Reviews Genetics, 2013, pp. 415-426, vol. 14, No. 6.
Knickelbein et al., "Mutant KRAS as a Critical Determinant of the Therapeutic Response of Colorectal Cancer", Genes & Diseases, 2015, pp. 4-12, vol. 2, No. 1.
Krishnamurthy et al. "Caught in the Act: Covalent Crosslinking Captures Activator-Coactivator Interactions in Vivo", ACS Chemical Biology, 2011, pp. 1321-1326, vol. 6, No. 12.
Kumar et al., "A Selective Turn-On Fluorescent Sensor for Sulfur Mustard Simulants", Journal of the American Chemical Society, 2013, pp. 6338-6344, vol. 135, No. 16.

(56) References Cited

OTHER PUBLICATIONS

Li et al., "Electrochemical Detection of Single-Nucleotide Mismatches Using an Electrode Microarray", Analytical Chemistry, 2006, pp. 6096-6101, vol. 78, No. 17.

Lindahl et al., "DNA N-Glycosidases: Properties of Uracil-DNA Glycosidase from *Escherichia coli*", The Journal of Biological Chemistry, 1977, pp. 3286-3294, vol. 252, No. 10.

Luce et al., "Chemical Cross-Linking of Drugs to DNA", Methods in Enzymology, 2001, pp. 396-412, vol. 340.

McHugh et al., "Novel Reagents for Chemical Cleavage at Abasic Sites and UV Photoproducts in DNA", Nucleic Acids Research, 1995, pp. 1664-1670, vol. 23, No. 10.

Nejad et al., "Preparation and Purification of Oligodeoxynucleotide Duplexes Containing a Site-Specific, Reduced, Chemically-Stable Covalent Interstrand Cross-Link between a Guanine Residue and an Abasic Site", Methods in Molecular Biology, 2019, pp. 163-175, vol. 1973.

Nejad et al., "Sequence-Specific Covalent Capture Coupled with High-Contrast Nanopore Detection of a Disease-Derived Nucleic Acid Sequence", Chembiochem, 2017, pp. 1383-1386, vol. 18, No. 14.

Nishimoto et al., "4-Vinyl-Substituted Pyrimidine Nucleosides Exhibit the Efficient and Selective Formation of Interstrand Cross-Links with RNA and Duplex DNA", Nucleic Acids Research, 2013, pp. 6774-6781, vol. 41, No. 13.

Peng et al., "Facile SNP Detection Using Bifunctional, Cross-Linking Oligonucleotide Probes", Nucleic Acids Research, 2008, pp. 1-7, vol. 36, No. 5.

Pham et al., "Photocrosslinking Approaches to Interactome Mapping", Current Opinion in Chemical Biology, 2013, pp. 90-101, vol. 17, No. 1.

Prasad et al., "Suicidal Cross-Linking of PARP-1 to AP Site Intermediates in Cells Undergoing Base Excision Repair", Nucleic Acids Research, 2014, pp. 6337-6351, vol. 42, No. 10.

Price et al., "Interstrand DNA-DNA Cross-Link Formation Between Adenine Residues and Abasic Sites in Duplex DNA", Journal of the American Chemical Society, 2014, pp. 3483-3490, vol. 136, No. 9.

Price et al., "Replication and Repair of a Reduced 2'-Deoxyguanosine-Abasic Site Interstrand Cross-Link in Human Cells", Nucleic Acids Research, Apr. 20, 2017, pp. 6486-6493, vol. 45, No. 11.

Riely et al., "Frequency and Distinctive Spectrum of KRAS Mutations in Never Smokers with Lung Adenocarcinoma", Clinical Cancer Research, 2008, pp. 5731-5734, vol. 14, No. 18.

Riely et al., "KRAS Mutations: An Old Oncogene Becomes a New Predictive Biomarker", Journal of Molecular Diagnostics, 2008, pp. 493-495, vol. 10, No. 6.

Rossetti et al., "The Structural Impact of DNA Mismatches", Nucleic Acids Research, 2015, pp. 4309-4321, vol. 43, No. 8.

Secor et al., "Selective Amine Recognition: Development of a Chemosensor for Dopamine and Norepinephrine", Organic Letters, 2004, pp. 3727-3730, vol. 6, No. 21.

Shi et al., "Generation and Single-Molecule Characterization of a Sequence-Selective Covalent Cross-Link Mediated by Mechlorethamine at a C-C Mismatch in Duplex DNA for Discrimination of a Disease-Relevant Single Nucleotide Polymorphism", Bioconjugate Chemistry, 2018, pp. 3810-3816, vol. 29, No. 11.

Silverman et al., "Oligonucleotide Probes for RNA-Targeted Fluorescence In Situ Hybridization", Advances in Clinical Chemistry, 2007, pp. 79-115, vol. 43.

Simon, "Insight into lncRNA Biology Using Hybridization Capture Analyses", Biochimica et Biophysica Acta, 2016, pp. 121-127, vol. 1859, No. 1.

Sletten et al., "Bioorthogonal Chemistry: Fishing for Selectivity in a Sea of Functionality", Angewandte Chemie (International Edition in English), 2009, pp. 6974-6998, vol. 48, No. 38.

Stephanopoulos, "Strategies for Stabilizing DNA Nanostructures to Biological Conditions", ChemBioChem, 2019, pp. 2191-2197, vol. 20, No. 17.

Stevens et al., "Furan-Modified Oligonucleotides for Fast, High-Yielding and Site-Selective DNA Inter-Strand Cross-Linking with Non-Modified Complements", Nucleic Acids Research, 2009, pp. 1555-1565, vol. 37, No. 5.

Stuart et al., "Synthesis and Properties of Oligodeoxynucleotides with an AP Site at a Preselected Position", Nucleic Acids Research, 1987, pp. 7451-7462, vol. 15, No. 18.

\* cited by examiner

Figure 1A,B

Figure 5A,B

```
Mutant target nc35C>G:    5'-TGCCTACGCCAGCAGCTCCAA-3'
Wild-type target          5'-TGCCTACGCCACCAGCTCCAA-3'
Probe 1.................5'-TTGGAGCTGCXGGCGTAGGCA-3'
Probe 2.................5'-TTGGAGCTGAXGGCGTAGGCA-3'
Probe 3.................5'-TTGGAGCTGCXTGCGTAGGCA-3'
Probe 4.................5'-TTGGAGCTGCXCGCGTAGGCA-3'
Probe 5.................5'-TTGGAGCTGCXAGCGTAGGCA-3'
Probe 6.................5'-TTGGAGCTGCXGCGTAGGCA-3'
Probe 7.................5'-TTGGAGCTGCXCGTAGGCA-3'
Probe 8.................5'-TTGGAGCTGCXACGTAGGCA-3'
Probe 9.................5'-TTGGAGCTGCXTGGCGTAGGCA-3'
Probe 10................5'-TTGGAGCTGCXCGGCGTAGGCA-3'
Probe 11................5'-TTGGAGCTGCXGGGCGTAGGCA-3'
Probe 12................5'-TTGGAGCTGCXAGGCGTAGGCA-3'

X=AP site
```

Figure 7

| Probe | Probe-Mut Duplex | Yield | Probe-WT Duplex | Yield | Description |
|---|---|---|---|---|---|
| 1 | A<br>5'GCXGG<br>3'CCACC | 7.2±0.9 | B<br>5'GCXGG<br>3'CCACC | 1.7±1.1 | Fully base-paired |
| 2 | C<br>5'GAXGG<br>3'CCACC | 4.2±0.6 | D<br>5'GAXGG<br>3'CCACC | 2.6±0.4 | Mispair w/target guanine |
| 3 | E<br>5'GCXTG<br>3'CCACC | 12.5±2.9 | F<br>5'GCXTG<br>3'CCACC | 3.1±1.0 | Mispair on 3'-side of AP |
| 4 | G<br>5'GCXCG<br>3'CCACC | 20.3±0.8 | H<br>5'GCXCG<br>3'CCACC | 2.5±0.6 | Mispair on 3'-side of AP |
| 5 | I<br>5'GCXAG<br>3'CCACC | 36.1±1.2 | J<br>5'GCXAG<br>3'CCACC | 5.1±0.4 | Mispair on 3'-side of AP |
| 6 | K<br>5'GCXGC<br>3'CGA CG<br>    C | 27.4±1.0 | L<br>5'GCXGC<br>3'CCA CG<br>    C | 2.4±0.3 | Bulge in target strand |
| 7 | M<br>5'GCXCG<br>3'CGA CG<br>    CC | 24.0±0.2 | N<br>5'GCXCG<br>3'CCA CG<br>    CC | 5.4±0.2 | Bulge in target strand |
| 8 | O<br>5'GCXAC<br>3'CGA CG<br>    C | 25.1±2.3 | P<br>5'GCXAC<br>3'CCA CG<br>    C | 5.5±0.4 | Bulge in target strand |
| 9 | Q<br>5'GCX$^T$GG<br>3'CCA CC | 2.4±0.2 | R<br>5'GCX$^T$GG<br>3'CCA CC | 3.0±0.3 | Bulge in probe strand |
| 10 | S<br>5'GCX$^C$GG<br>3'CCA CC | 17.0±0.8 | T<br>5'GCX$^C$GG<br>3'CCA CC | 7.5±0.4 | Bulge in probe strand |
| 11 | U<br>5'GCX$^G$GG<br>3'CCA CC | 12.1±1.3 | V<br>5'GCX$^G$GG<br>3'CCA CC | 8.0±0.4 | Bulge in probe strand |
| 12 | W, 37 °C<br>5'GCX$^A$GG<br>3'CCA CC | 51.6±6.4 | X, 37 °C<br>5'GCX$^A$GG<br>3'CCA CC | 10.2±3.3 | Bulge in probe strand |
| 12 | W, 24 °C | 35.3±1.6 | X, 24 °C | 5.3±0.7 | Bulge in probe strand |

Figure 8

SELECTIVE COVALENT CAPTURE OF A DNA SEQUENCE

CROSS-REFERENCE TO RELATED APPLICATIONS

This is a U.S. National Phase application of PCT application PCT/US2020/045632, filed on Aug. 10, 2020, which claims the benefit of U.S. provisional application 62/884,867, filed Aug. 9, 2019, each of which are incorporated herein by reference in their entireties.

STATEMENT REGARDING FEDERALLY-SPONSORED RESEARCH AND DEVELOPMENT

This invention was made with government support under HG009338 awarded by the National Institutes of Health, ES021007 award by the National Institutes of Health, and GM114204 awarded by the National Institutes of Health. The government has certain rights in the invention.

REFERENCE TO SEQUENCE LISTING SUBMITTED ELECTRONICALLY

The content of the electronically submitted sequence listing in ASCII text file (Name UMC_52553_19893_Seq_List.ST25.txt; Size: 5640 bytes; and Date of Creation: Aug. 10, 2020) filed with the application is incorporated herein by reference in its entirety.

BACKGROUND

Many bioanalytical applications employ covalent chemistry to generate robust signals for the detection of bioactive small molecules (Secor, 2004; Kumar, 2013), proteins (Chen, 2013; Sletten, 2009; Takaoka, 2013), protein-protein complexes (Krishnamurthy, 2011; Pham, 2013; Sutherland, 2008), protein-nucleic acid complexes (Hoffman, 2015; Simon, 2016; Engreitz, 2014), RNA-RNA interactions (Simon, 2016; Engreitz, 2014), chromatin structure (Yu, 2018), and proteins with particular functional properties (Cravatt, 2008; Willems, 2014). The detection of specific nucleic acid sequences is important in molecular biology and medicine (Katsanis, 2013) but covalent approaches are less common in this field, in part, due to a deficit of practical, predictable (programmable) reactions for the covalent attachment of probes to target sequences. Nucleic acid sequence detection almost universally relies upon Watson-Crick pairing of a nucleic acid probe strand with the target sequence in the sample (Demidov, 2004). Covalent cross-linking reactions can be used to anchor the probe strand to its target sequence thereby generating a probe-target complex that is impervious to denaturation (melting) that causes signal degradation in typical hybridization-based assays (FIG. 14) (Vieregg, 2013; Simon, 2016; Costes, 1993). Furthermore, sequence-specific covalent cross-linking reactions can add a layer of selectivity for a particular target sequence (Peng, 2008; Hattori, 2009; Nishimoto, 2013; Stevens, 2009; Fujimoto, 2013). For example, it has been shown that selective cross-link formation by mechlorethamine at a C-C mismatch in a probe-target complex can be used for selective detection of a disease-relevant T→C mutation in the BRAF kinase gene sequence (Shi, 2018). In a separate study, a reactive probe was employed containing an abasic (Ap) site for the selective detection of a T→A polymorphism in the BRAF gene (Imani-Nejad, 2017). In this case, covalent cross-linking of the probe strand to the target strand involved the reaction of the Ap aldehyde group in the probe with the exocyclic amino group of the adenine mutation in the target strand (Price, 2014; Catalano, 2016).

SUMMARY

Methods of producing covalently crosslinked nucleic acid strands, the method comprising incubating a hybridized, double-stranded nucleic acid molecule that comprises: (i) a target strand comprising a 2'-deoxyguanosine (dG) to be crosslinked (target dG); and (ii) an at least partially complementary probe strand comprising an abasic (Ap) residue, wherein, in the hybridized nucleic acid molecule, the Ap residue of the probe strand is at a position immediately 3' adjacent to the nucleotide residue in the probe strand that is directly opposite of the target dG in the target strand, and wherein incubation occurs under conditions that allow for a covalent cross link to form between the Ap residue of the probe strand and the target dG; thus producing covalently crosslinked nucleic acid strands. In certain embodiments, the incubation occurs in the presence of $NaCNBH_3$. In certain embodiments, the incubation occurs at a pH of less than or less than about pH 7, less or less than about pH 6.0, or less than or less than about pH 5.5 and optionally greater than or greater than about pH 4.5 or greater than or greater than about pH 5.0, e.g., at or at about pH 5.1, pH 5.2, or pH 5.3.

Methods of detecting the presence or absence of a dG residue at a particular position in a nucleic acid target strand (target dG), the method comprising incubating a hybridized double-stranded nucleic acid molecule comprising: (i) a target strand; and (ii) an at least partially complementary probe strand that comprises an abasic (Ap) residue, wherein the Ap residue of the probe strand is at a position that is immediately 3' adjacent to the nucleotide residue in the probe strand that is directly opposite to the particular position in the target strand where the presence or absence of the target dG residue is to be detected, wherein the incubation occurs under conditions that allow for a covalent cross link to form between the Ap residue in the probe strand and the target dG residue in the target strand, if present, and detecting whether crosslinking of the target and probe strands occurred, thereby detecting the presence or absence of the target dG residue at the particular position in the target strand. In certain embodiments, the probe strand, the target strand, or both the probe strand and the target strand, is a DNA molecule. In certain embodiments, the target strand comprises genomic or mitochondrial DNA. In certain embodiments, covalently crosslinking of the probe strand and the target strand is detected by gel electrophoresis, monitoring of thermal stability, fluorescence methods (i.e. FRET), electrochemistry, surface plasmon resonance, or a nanopore-based sensor, and optionally wherein covalently crosslinking of the probe strand and the target strand is detected by a nanopore-based sensor. In certain embodiments, said detection is quantitative. In certain embodiments, the incubation occurs in the presence of $NaCNBH_3$. In certain embodiments, the incubation occurs at a pH of less than or less than about pH 7, less or less than about pH 6.0, or less than or less than about pH 5.5 and optionally greater than or greater than about pH 4.5 or greater than or greater than about pH 5.0, e.g., at or at about pH 5.1, pH 5.2, or pH 5.3.

Method of detecting a mutation in a wild-type sequence, the method comprising detecting the presence or absence of a target dG residue at a particular position in a target strand according to any of the methods disclosed herein.

Method of detecting the presence of a dG residue in a nucleic acid strand, the method comprising incubating a hybridized, double-stranded nucleic acid molecule that comprises: (i) a target strand comprising a dG residue to be detected (target dG); and (ii) an at least partially complementary probe strand that comprises an abasic (Ap) residue, wherein, in the hybridized molecule, the Ap residue of the probe strand is at a position immediately 3' adjacent to the nucleotide residue in the probe strand that is directly opposite of the target dG residue in the target strand, and wherein incubation occurs under conditions that allow for a covalent cross link to form between the Ap residue in the probe strand and the target dG residue in the target strand, and detecting covalent crosslinking of the probe strand and target strand between the Ap residue in the probe strand and the target dG, thus detecting the presence of the target dG residue in the target strand. In certain embodiments, the probe strand, the target strand, or both the probe strand and the target strand, is a DNA molecule. In certain embodiments, the target strand is genomic or mitochondrial DNA. In certain embodiments, the covalently crosslinking of the probe strand and the target strand is detected by gel electrophoresis, monitoring of thermal stability, fluorescence methods (i.e. FRET), electrochemistry, surface plasmon resonance, or a nanopore-based sensor, and optionally wherein covalently crosslinking of the probe strand and the target strand is detected by a nanopore-based sensor. In certain embodiments, said detection is quantitative. In certain embodiments, the incubation occurs in the presence of $NaCNBH_3$. In certain embodiments, the incubation occurs at a pH of less than or less than about pH 7, less or less than about pH 6.0, or less than or less than about pH 5.5 and optionally greater than or greater than about pH 4.5 or greater than or greater than about pH 5.0, e.g., at or about pH 5.1, pH 5.2, or pH 5.3.

Covalently crosslinked, hybridized double-stranded nucleic acid molecules, comprising a probe strand that comprises an abasic (Ap) residue and a target strand that comprises a 2'-deoxyadenosine (dG) residue, wherein the Ap residue is at a position immediately 3' adjacent to the nucleotide residue in the probe strand that is directly opposite to the dG residue in the target strand, and wherein the Ap residue is covalently crosslinked to the dG residue in the target strand that is directly opposite to the nucleotide residue in the probe strand that is immediately 3' adjacent to the Ap residue. In certain embodiments, the probe strand, the target strand, or both the probe strand and the target strand, is a DNA molecule. In certain embodiments, the target strand comprises genomic or mitochondrial DNA. And, in certain embodiments, the nucleic acid molecule is isolated.

BRIEF DESCRIPTION OF THE DRAWINGS/FIGURES

FIG. 1A,B. FIG. 1 shows selective covalent capture of a sequence corresponding to KRAS nc35C>G by probes 1 and 12. Probe-target duplexes were incubated in sodium acetate (750 mM, pH 5.2) buffer containing $NaCNBH_3$ (200 mM) for 24 h at 37° C. Formamide loading buffer was added and the DNA in the samples resolved by electrophoresis on a denaturing 20% polyacrylamide gel. Following separation, the $^{32}P$-labeled oligonucleotides in the gel were visualized by phosphorimager analysis. A: Covalent capture of mutant and wild-type KRAS sequences by probe 1. Lane 1: 5'-$^{32}P$-labeled AP-containing probe 1; lane 2: probe 1 treated with piperidine to induce cleavage at the Ap site; lane 3: cross-link formation in the probe-mutant complex; lane 4: cross-link formation in the probe-wild type complex. B: Covalent capture of mutant and wild-type KRAS sequences by probe 12. Lane 1: 5'-$^{32}P$-labeled AP-containing probe 12; lane 2: probe 12 treated with piperidine to induce cleavage at the Ap site; lane 3: cross-link formation in the probe-mutant complex; lane 4: cross-link formation in the probe-wild type complex. The values shown are the averages and standard deviations calculated from three or more measurements.

Figure 2:
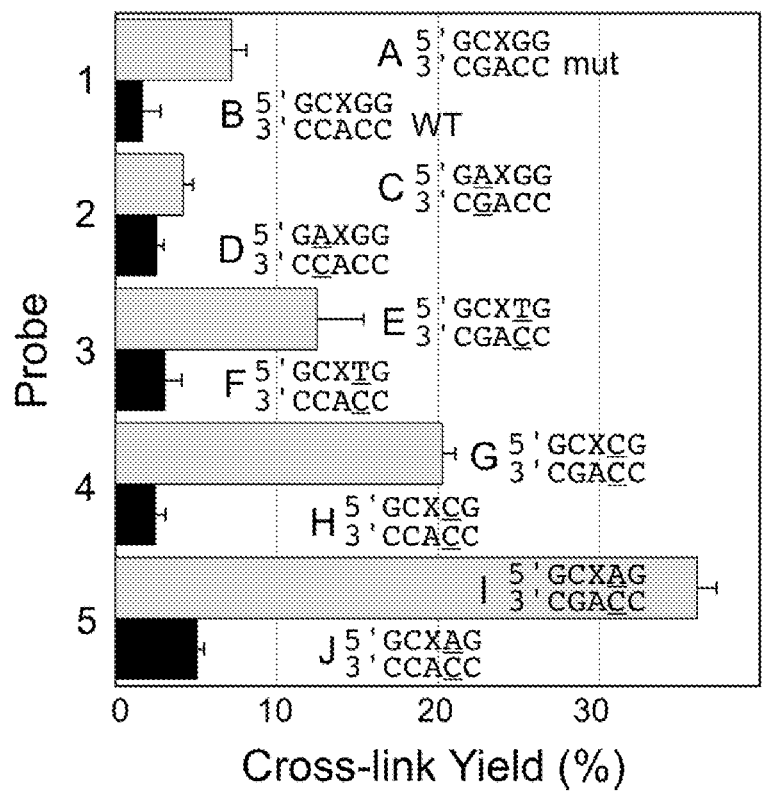

FIG. 2. FIG. 2 shows yield and selectivity for the covalent capture (cross-linking) of mutant KRAS versus WT KRAS gene sequence by reactive, AP-containing probes (X=Ap in the sequences shown). Cross-linking reactions and gel electrophoretic analysis were carried out as described for FIG. 1. The sequence of probe 1 was designed to generate a fully base-paired probe-target complex. Probes 2-5 formally introduce mismatches at various locations in the probe target complexes (underlined in the sequences shown). The cross-link yield generated in the probe-mutant complex is the top bar of each pair (gray) and the probe-WT complex is the bottom bar in each pair (black).

Figure 3:
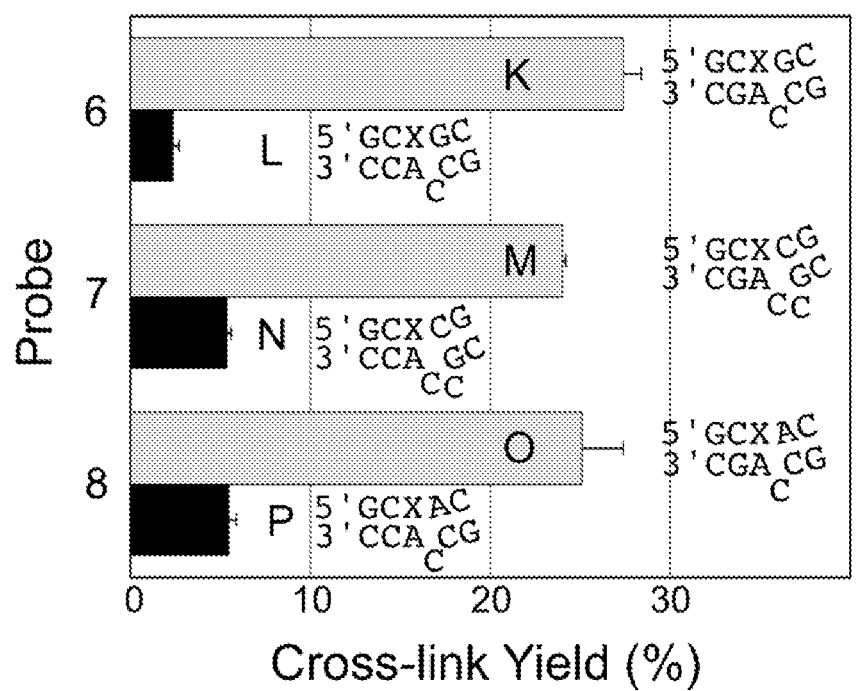

FIG. 3. FIG. 3 shows yield and selectivity for the covalent capture (cross-linking) of mutant KRAS and WT KRAS gene sequences by reactive, AP-containing probes (X=Ap in the sequences shown). Cross-linking reactions and gel electrophoretic analysis were carried out as described for FIG. 1. The probe sequence was varied in a manner that formally introduced bulges on the target strand of the probe-target complex. Cross-link yield generated in the probe-mutant complex is the top bar of each pair (gray) and that generated in the probe-WT complex is the bottom bar of each pair (black).

Figure 4:
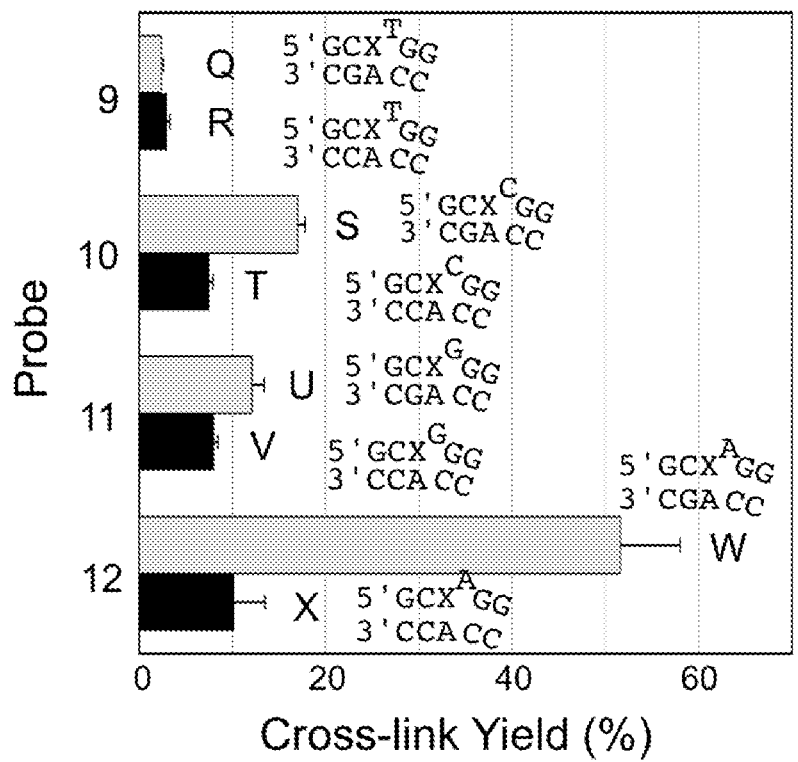

FIG. 4. FIG. 4 shows yield and selectivity for the covalent capture (cross-linking) of mutant KRAS and WT KRAS gene sequences by reactive, AP-containing probes (X=Ap in the sequences shown). Cross-linking reactions and gel electrophoretic analysis were carried out as described for FIG. 1. The probe sequence was varied in a manner that formally introduced bulges on the probe strand of the probe-target complex. Cross-link yield generated in the probe-mutant complex is the top bar of each pair (gray) and that generated in the probe-WT complex is the bottom bar of each pair (black).

Figure 5:
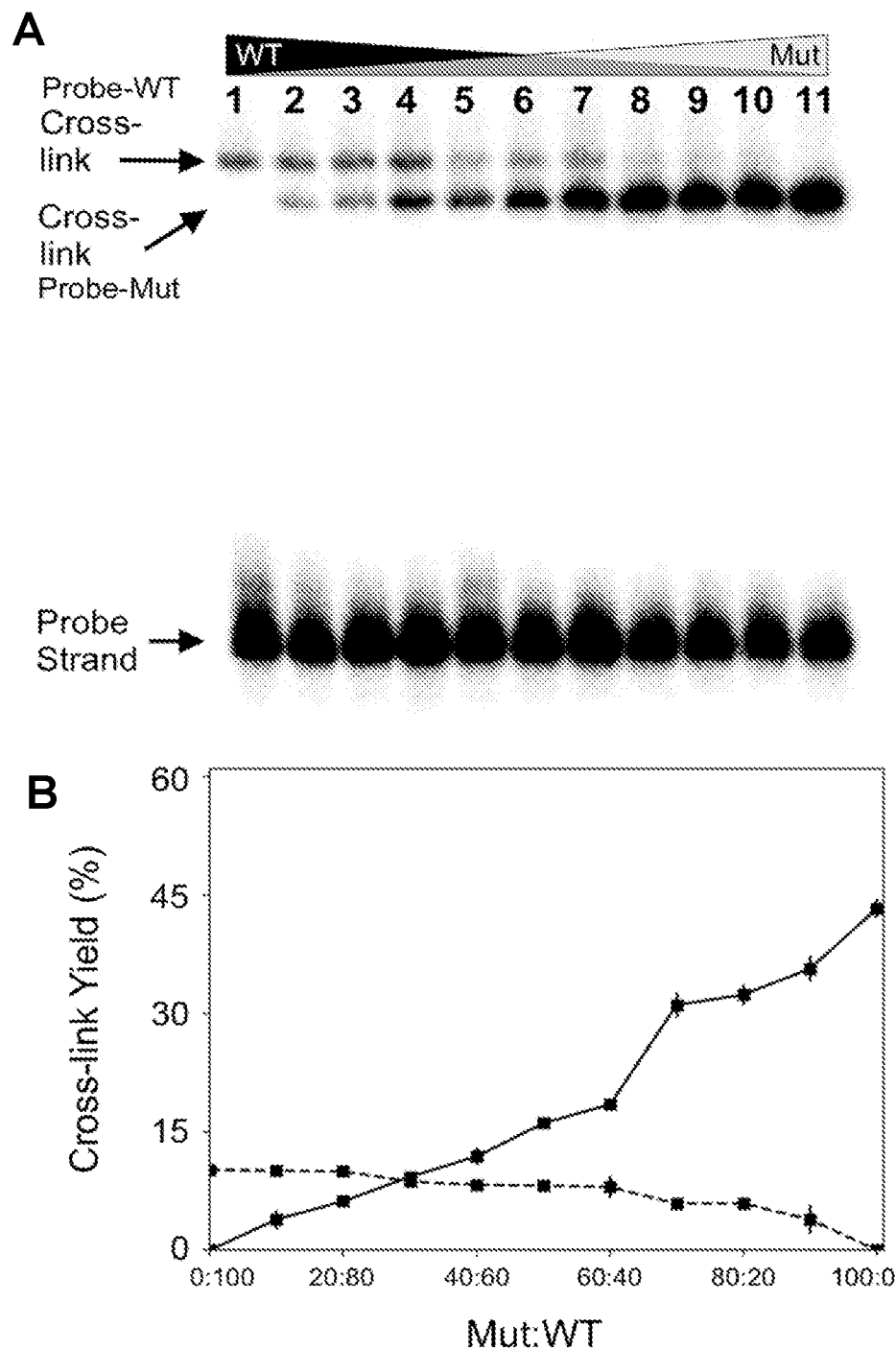

FIG. 5A,B. FIG. 5 shows the formation of two distinct cross-linked species can be detected in the reaction of probe 12 with mixtures containing varying ratios of mutant KRAS and WT KRAS sequences. Cross-linking reactions and gel electrophoretic analysis were carried out as described for FIG. 1. A: gel electrophoretic analysis of cross-link formation by probe 12 with mixtures of mutant KRAS and wild-type KRAS sequences. The low yield cross-link formed with the wild type sequence is clearly distinguished from the high yield cross-link formed with the mutant KRAS sequence. B: a plot of the gel electrophoretic data showing the yields of probe-wild type and probe-mutant cross-links generated by incubation of probe 12 with mixtures containing varying ratios of wild-type KRAS and mutant KRAS sequence.

Figure 6:
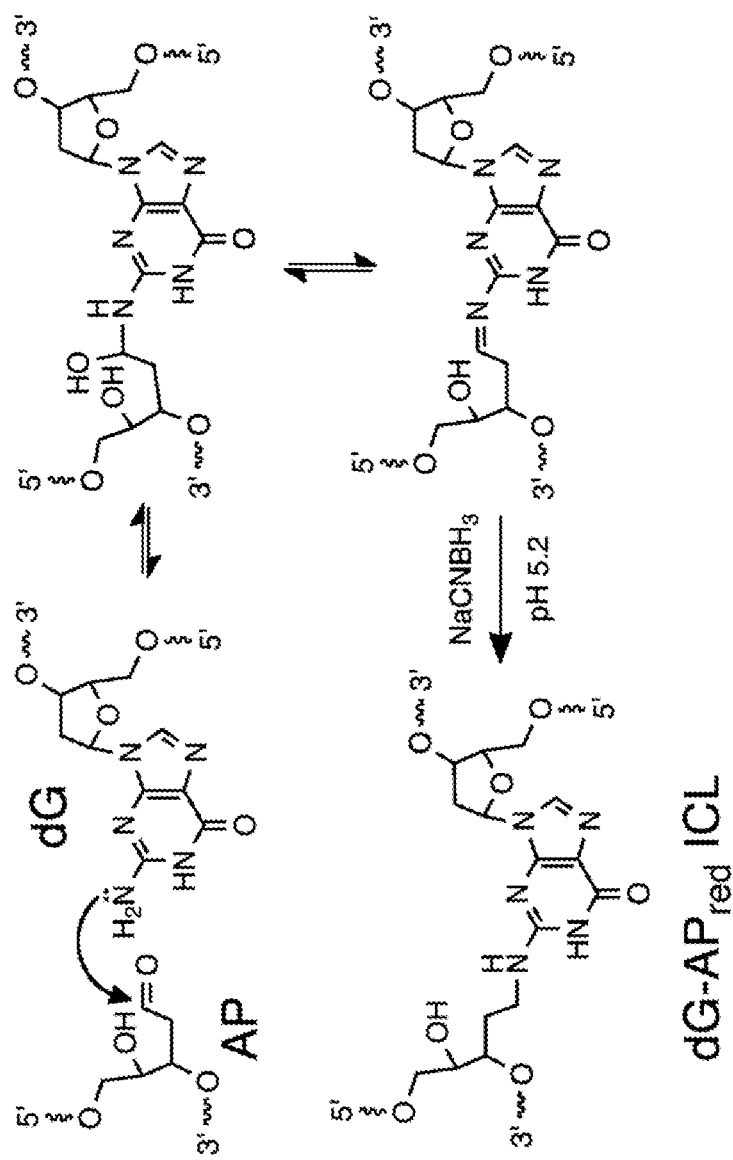

FIG. 6. FIG. 6 illustrates Scheme 1 for the covalent capture of target sequence via reaction of an Ap site in the probe strand with a guanine residue in the target strand.

FIG. 7. FIG. 7 lists the sequences of oligonucleotides used in the Examples: mutant target nc35C>G (SEQ ID NO: 1); wild-type target (SEQ ID NO: 2); Probe 1 (SEQ ID NO: 3); Probe 2 (SEQ ID NO: 4); Probe 3 (SEQ ID NO: 5); Probe 4 (SEQ ID NO: 6); Probe 5 (SEQ ID NO: 7); Probe 6 (SEQ ID NO: 8); Probe 7 (SEQ ID NO: 9); Probe 8 (SEQ ID NO:

10); Probe 9 (SEQ ID NO: 11); Probe 10 (SEQ ID NO: 12); Probe 11 (SEQ ID NO: 13); and Probe 12 (SEQ ID NO: 14).

FIG. 8. FIG. 8 shows yields of covalent capture (cross-link formation) for various probes with sequences corresponding to nc35C>G variant (Mut) and wild-type (WT) KRAS gene sequences.

Figure 9:
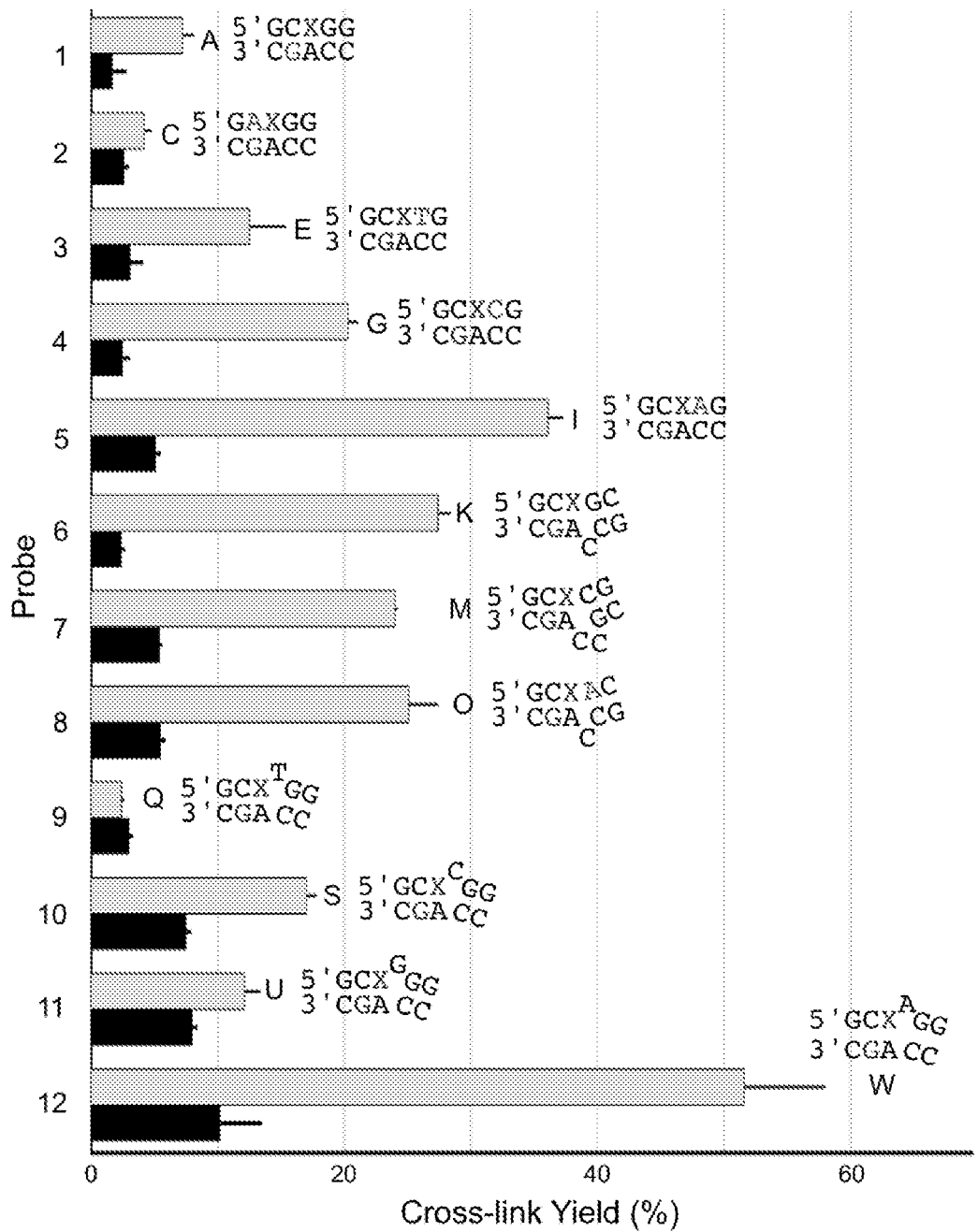

FIG. 9. FIG. 9 is a bar graph comparing the yields and selectivities of covalent capture of mutant KRAS and WT KRAS sequences by various AP-containing probes. Probe-target complexes shown are the nc35C>G variant (Mut) of the KRAS gene sequence. Cross-link yields generated in the probe-mutant complexes are shown in the top bar of each pair (in gray) and the cross-link yields generated in the probe-WT (nc35C instead of G) KRAS sequence are shown in the lower bar of each pair (in black). The error bars depict the standard deviation calculated from at least three measurements.

Figure 10:
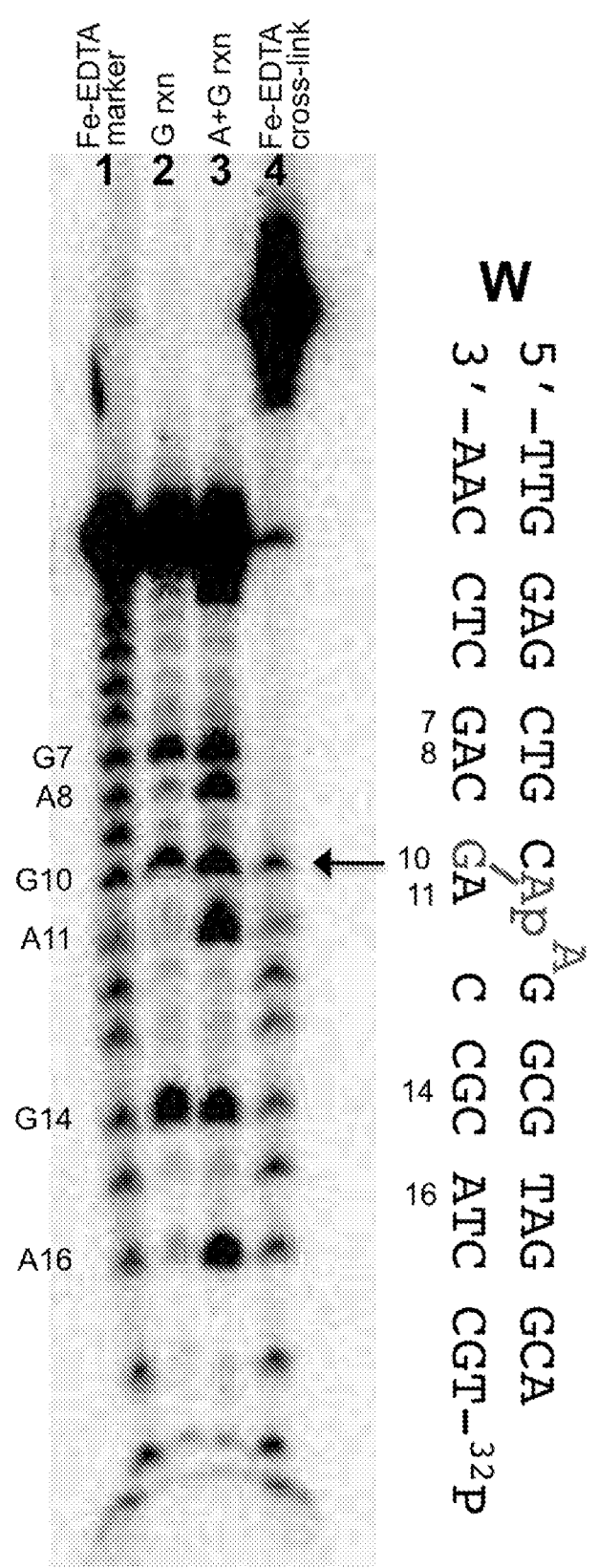

FIG. 10. FIG. 10 shows iron-EDTA footprinting evidencing that cross-link generation by probe 12 (top, SEQ ID NO: 14) in duplex W involves attachment at the guanine mutation in the nc35C>G KRAS sequence (bottom, SEQ ID NO: 1). In this experiment, the site of cross-link attachment appears as the last band (marked with an arrow) before an interruption in the "ladder" of cleavage products generated by the iron-EDTA-$H_2O_2$ DNA-cleaving reagent, because cleavages beyond the cross-link yield large, slowly-migrating DNA fragments (seen in the upper part of lane 4) that are connected to the opposing strand (Luce, R. A.; Hopkins, P. B. Methods Enzymol. 2001, 340, 396-412). Lane 1: Fe-EDTA cleavage of the uncross-linked control; Lane 2: is a Maxam-Gilbert G-specific cleavage (sequencing) reaction on the 5'-$^{32}$P-labeled nc35C>G target strand; Lane 3 is an A+G specific cleavage (sequencing) reaction of the 5'-$^{32}$P-labeled nc35C>G target strand; Lane 4 is the hydroxyl radical footprinting reaction of the isolated probe-target duplex ($^{32}$P-labeled on the nc35C>G target strand). The $^{32}$P-labeled oligodeoxynucleotides were resolved on a 20% denaturing polyacrylamide gel and visualized by phosphorimager analysis.

Figure 11:
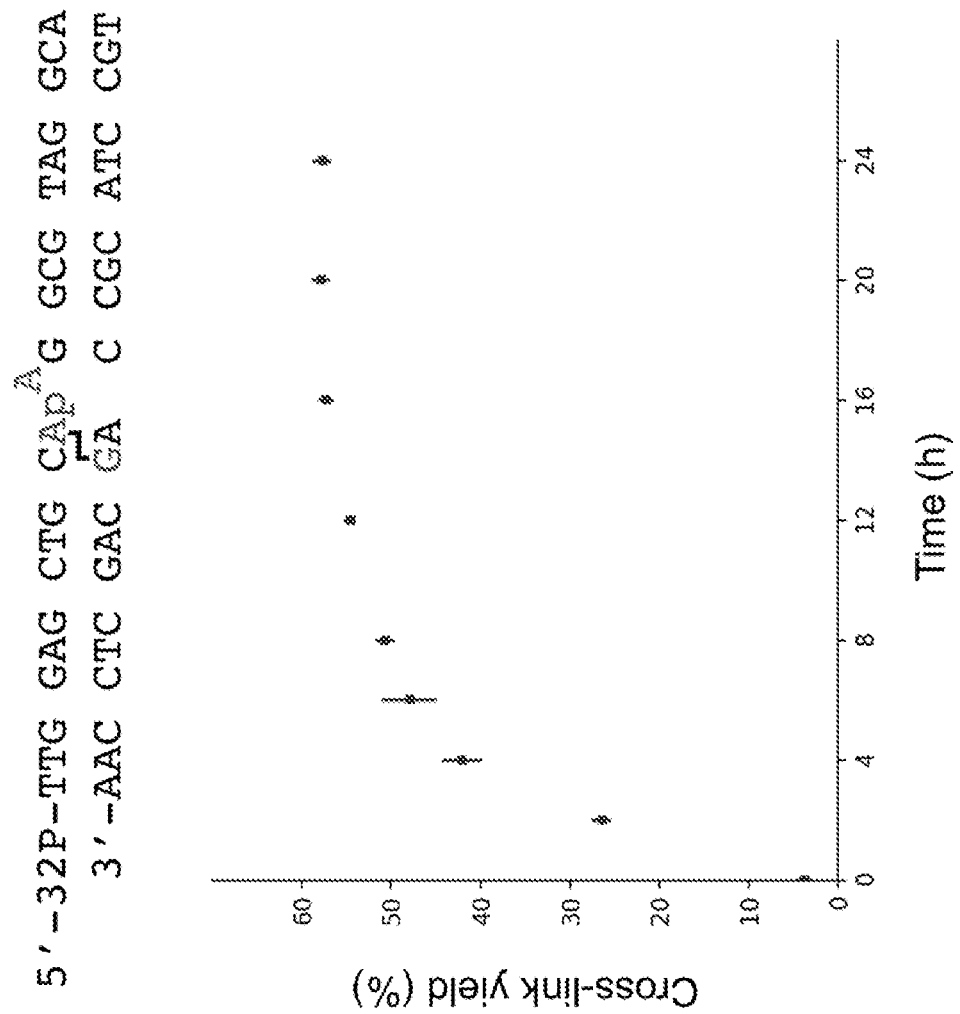

FIG. 11. FIG. 11 shows a time course for cross-link formation in duplex W (top, SEQ ID NO: 14; bottom, SEQ ID NO: 1). The probe-target duplex W was incubated in sodium acetate buffer (750 mM, pH 5) containing NaCNBH$_3$ (250 mM) at 37° C. At various times aliquots were removed from the reaction, the DNA ethanol precipitated, and stored at −20° C. until electrophoretic analysis. The samples were dissolved in formamide loading buffer, loaded onto a denaturing 20% polyacrylamide gel and the DNA fragments resolved by electrophoresis. The $^{32}$P-labeled oligodeoxynucleotides were resolved on a 20% denaturing polyacrylamide gel and visualized by phosphorimager analysis. The plot shows the percent yield of cross-link as a function of time.

Figure 12:
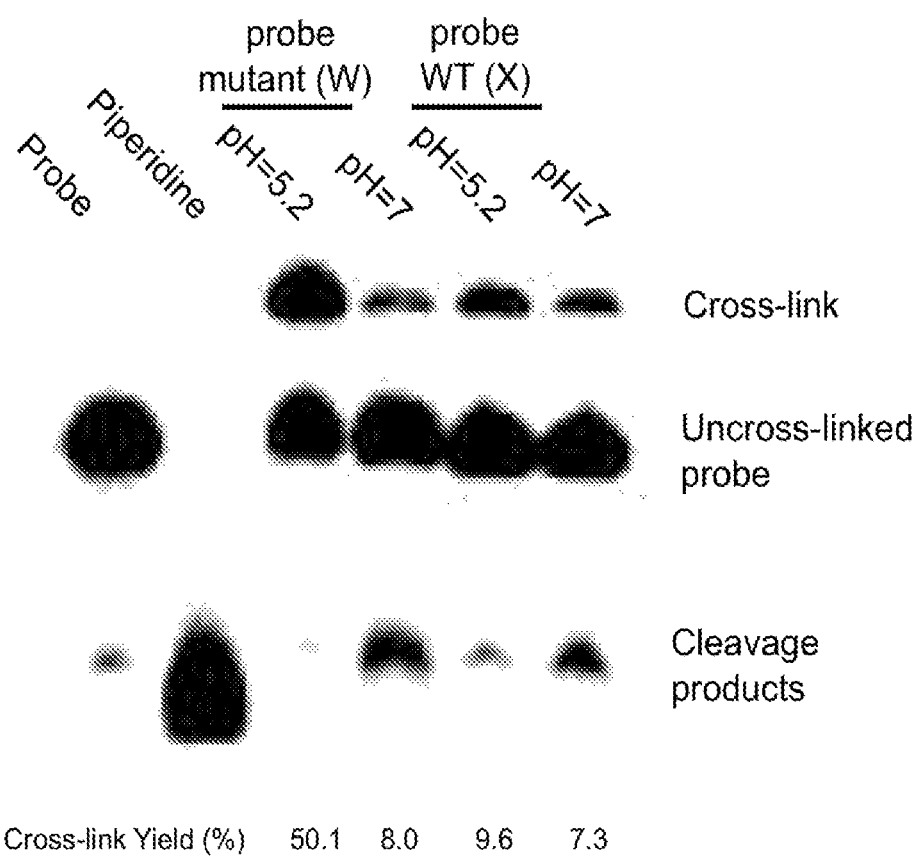

FIG. 12. FIG. 12 shows effects of pH on the yield and selectivity of probe 12 for covalent capture of the mutant KRAS and wild-type KRAS gene sequences (duplexes W and X). Lane 1: labeled probe strand; lane 2: probe strand treated with piperidine to induce strand cleavage at the Ap site (0.1 M piperidine, 30 min, 95° C.); lane 3: duplex W, sodium acetate (750 mM, pH 5.2) and NaCNBH$_3$ (200 mM); lane 4: duplex W, HEPES (50 mM, pH 7), NaCl (100 mM) and NaCNBH$_3$ (200 mM); lane 5: duplex X, sodium acetate (750 mM, pH 5.2) and NaCNBH$_3$ (200 mM); lane 6: duplex X, HEPES (50 mM, pH 7), NaCl (100 mM) and NaCNBH$_3$ (200 mM).

Figure 13:
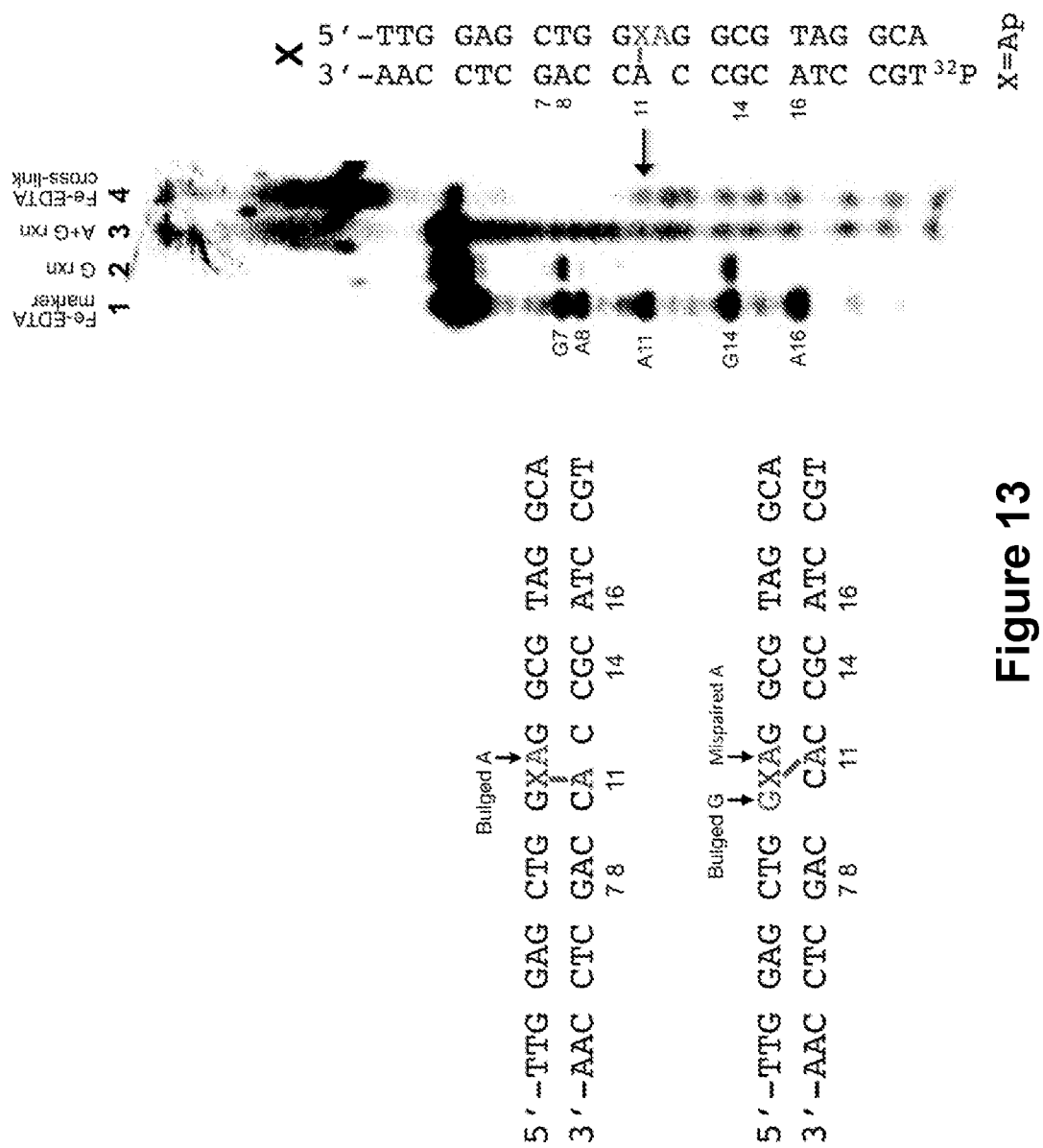

FIG. 13. FIG. 13 shows iron-EDTA footprinting provides evidence that cross-link generation by probe 12 (5'-TTG-GAGCTGGXAGGCGTAGGCA-3'; SEQ ID NO: 14) in duplex X involves attachment at the opposing adenine residue in the wild type (WT) KRAS sequence (5'-TGCC-TACGCCACCAGCTCCAA-3'; SEQ ID NO: 2). In this experiment, the site of cross-link attachment appears as the last band (marked with an arrow) before an interruption in the "ladder" of cleavage products generated by the iron-EDTA-$H_2O_2$ DNA-cleaving reagent, because cleavages beyond the cross-link yield large, slowly-migrating DNA fragments (seen in the upper part of lane 4) that are connected to the opposing strand (Luce, R. A.; Hopkins, P. B. Methods Enzymol. 2001, 340, 396-412). Lane 1: Fe-EDTA cleavage of the uncross-linked control; Lane 2: is a Maxam-Gilbert G-specific cleavage (sequencing) reaction on the 5'-$^{32}$P-labeled WT target strand; Lane 3 is an A+G specific cleavage (sequencing) reaction of the 5'-$^{32}$P-labeled WT target strand; Lane 4 is the hydroxyl radical footprinting reaction of the isolated probe-WT duplex ($^{32}$P-labeled on the wild-type target strand). The $^{32}$P-labeled oligodeoxynucleotides were resolved on a 20% denaturing polyacrylamide gel and visualized by phosphorimager analysis. The probe-target complex has the potential to exist in (at least) two different forms (shown above, left). Cross-link formation in the WT KRAS sequence could proceed via a duplex with a bulged adenine residue (top left) or bulged guanine residue (bottom left). The complex with the bulged adenine places the target adenine residue into a potentially favorable arrangement for cross-link formation, similar to that seen in: Imani Nejad, M., et al., ChemBioChem. 2017, 18, 1383-1386.

Figure 14:
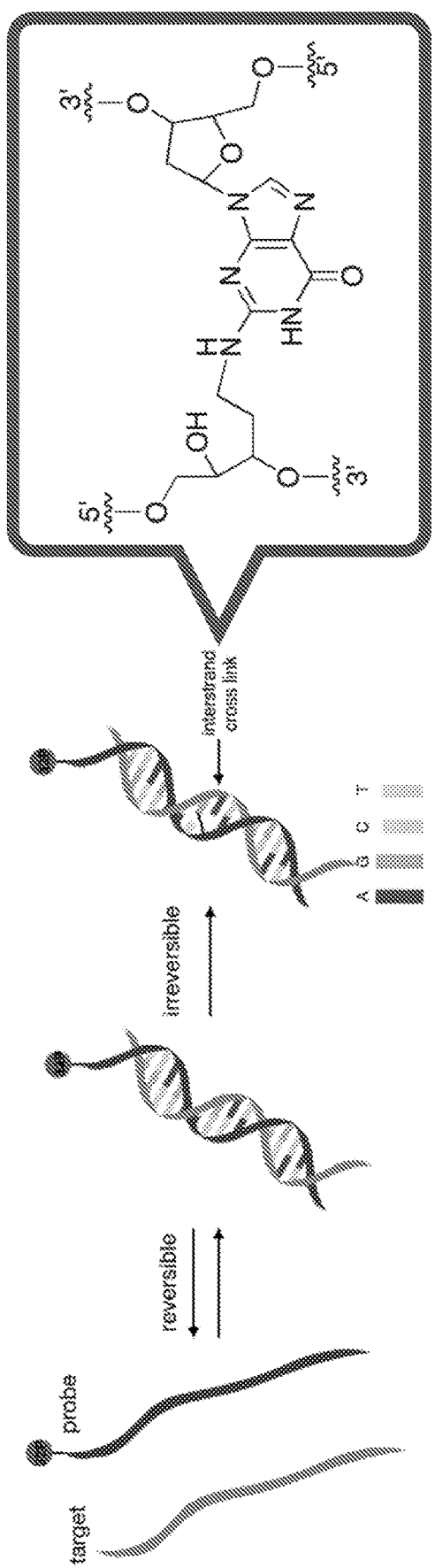

FIG. 14. FIG. 14 illustrates that while hybridization of nucleic acid strands is reversible, resulting in a probe-target complex that is unstable and can lead to signal loss, covalent interstrand cross linking of the probe-target duplex provides a more stable signal.

DETAILED DESCRIPTION

The terms defined immediately below are more fully defined by reference to the specification in its entirety. To the extent necessary to provide descriptive support, the subject matter and/or text of the appended claims is incorporated herein by reference in their entirety.

Definitions

It will be understood by all readers of this written description that the exemplary aspects and embodiments described and claimed herein can be suitably practiced in the absence of any recited feature, element or step that is, or is not, specifically disclosed herein.

The term "a" or "an" entity refers to one or more of that entity; for example, "a probe," is understood to represent one or more "probes." As such, the terms "a" (or "an"), "one or more," and "at least one" can be used interchangeably herein.

The term "and/or" where used herein is to be taken as specific disclosure of each of the specified features or components with or without the other. Thus, "and/or" as used in a phrase such as "A and/or B" herein is intended to include "A and B," "A or B," "A" (alone), and "B" (alone). Likewise, "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

It is understood that wherever aspects are described herein with the language "comprising," otherwise analogous aspects described in terms of "consisting of" and/or "consisting essentially of" are also provided.

Unless defined otherwise, technical and scientific terms used herein have the same meaning as commonly understood by one of ordinary skill in the art to which this disclosure is related. For example, unless otherwise specified, "complementary" base pairs refers to A/T and G/C base pairing.

Numeric ranges are inclusive of the numbers defining the range. Even when not explicitly identified by "and any range in between," or the like, where a list of values is recited, i.e., 1, 2, 3, or 4, the disclosure specifically includes any range in between the values, i.e., 1 to 3, 1 to 4, 2 to 4, etc.

The headings provided herein are solely for ease of reference and are not limitations of the various aspects or aspects of the disclosure, which can be had by reference to the specification as a whole.

As used herein, the term "identity," i.e., "percent identity" to an amino acid sequence or to a nucleotide sequence disclosed herein refers to a relationship between two or more nucleotide sequences or between two or more amino acid sequences. When a position in one sequence is occupied by the same nucleic acid base or amino acid in the corresponding position of the comparator sequence, the sequences are said to be "identical" at that position. The percentage "sequence identity" is calculated by determining the number of positions at which the identical nucleic acid base or amino acid occurs in both sequences to yield the number of "identical" positions. The number of "identical" positions is then divided by the total number of positions in the comparison window and multiplied by 100 to yield the percentage of "sequence identity." Percentage of "sequence identity" is determined by comparing two optimally aligned sequences over a comparison window. In order to optimally align sequences for comparison, the portion of a nucleotide or amino acid sequence in the comparison window can comprise additions or deletions termed gaps while the reference sequence is kept constant. An optimal alignment is that alignment which, even with gaps, produces the greatest possible number of "identical" positions between the reference and comparator sequences. Percentage "sequence identity" between two sequences can be determined using, i.e., the program "BLAST" which is available from the National Center for Biotechnology Information, and which program incorporates the programs BLASTN (for nucleotide sequence comparison) and BLASTP (for amino acid sequence comparison), which programs are based on the algorithm of Karlin and Altschul (Proc. Natl. Acad. Sci. USA 90 (12): 5873-5877, 1993).

As used herein, the term "complementary" when referring to nucleic acid molecules is given its standard definition for complementary Watson-Crick base pairing as understood in the art. "Percent (%) complementary" can be determined as explained for "percent identity" except for based on the number of complementary positions when a sense and antisense strand are aligned, rather than identical positions in an alignment.

The term "nucleic acid" is a well-known term of art and is used herein to include DNA and RNA. Unless otherwise specified, a "nucleic acid" molecule and "polynucleotide" can be used interchangeably. A nucleic acid can comprise a conventional phosphodiester bond or a non-conventional bond (i.e., an amide bond, such as found in peptide nucleic acids (PNA)). In certain aspects, a nucleic acid is DNA. By "isolated" nucleic acid it is intended a nucleic acid molecule that has been removed from its native environment, such as a sample of genomic DNA obtained from a subject. Isolated RNA molecules include in vivo or in vitro RNA transcripts of polynucleotides. Isolated polynucleotides or nucleic acids further include such molecules produced synthetically.

As used herein the term "engineered" includes manipulation of nucleic acid or polypeptide molecules by synthetic means (i.e. by recombinant techniques, in vitro peptide synthesis, by enzymatic or chemical coupling of peptides or some combination of these techniques).

Overview

Covalent reactions are widely used in bioanalytical chemistry for the detection of bioactive metabolites, protein-protein complexes, and proteins with particular catalytic functions. The detection of specific nucleic acid sequences is important in molecular biology and medicine and covalent cross-linking reactions have the potential to enhance selectivity for a particular target sequence and prevent denaturation (melting) of probe-target complexes that causes signal degradation in typical hybridization-based assays (see e.g., US20190271029A1 which is incorporated by reference herein in its entirety). Nonetheless, covalent approaches are less common in this field, in part, due to a deficit of simple and reliable reactions for the covalent capture of target sequences. Disclosed herein are chemically reactive nucleic acid probes that hybridize with, and covalently capture, a target sequence comprising a 2'-deoxyguanosine (dG) residue, such as in the cytosine to guanine mutation at position 35 corresponding to a cancer-driving variant of the human KRAS gene (SEQ ID NO: 15). This approach exploits a reductive amination reaction to generate a stable covalent attachment between an abasic site in the probe strand and the dG. Importantly, it is disclosed that the introduction of non-canonical structures such as bulges and mispairs into the probe-target duplex can dramatically improve performance in terms of the yields and selectivities with which probes capture the target dG sequence. In certain embodiments, an abasic site-containing probe enabled simultaneous quantitative detection of sequences in which dG was present and sequences in which dG was absent in mixtures.

Disclosed herein is the utility of a distinct cross-linking reaction designed to expand the arsenal for covalent capture of defined DNA sequences. This process exploits a reductive amination reaction between an Ap aldehyde group in the probe strand and the exocyclic amino group of a guanine residue in the target sequence to generate a stable, covalently cross-linked probe-target complex (Scheme 1; FIG. 6) (Dutta, 2007; Johnson, 2013). The reaction proceeds via initial equilibrium formation of an imine intermediate that is subsequently reduced by sodium cyanoborohydride ($NaCNBH_3$) (Borch, 1971) to provide an $N^2$-alkylguanine cross-link (Dutta, 2007; Johnson, 2013). Importantly, it was demonstrated that probe sequences that introduced non-canonical structures such as bulges and mispairs into the probe-target duplex generated dramatically improved yields and selectivities for covalent capture of the target sequence.

Crosslinked probe-target molecules can be detected by many protocols, for example, by typical fluorescence (A. P. Silverman, et al., Chem. Rev. 2006, 106, 3775; J. G. Wetmur, Crit. Rev. Biochem. Mol. Biol., 1991, 26, 227; S. Tyagi, et al., Nat. Biotechnol. 1996, 14, 303; A. P. Silverman, et al., Adv. Clin. Chem. 2007, 43, 79; V. V. Demidov, et al., Trends Biochem. Sci. 2004, 29, 62; L. Hu, et al., Biomark. Res. 2014, 2, 3), colorimetric (I. Alexandre, et al., Anal. Biochem. 2001, 295, 1), or electrochemical methods (X. Li, et al., Anal. Chem. 2006, 78, 6096). In certain aspects, nanopore technology, combined with sequence-specific crosslinking chemistry, provides a high contrast—in essence, digital—signal for single-molecule sensing of nucleic acid sequences.

Methods of Producing Covalently Crosslinked Nucleic Acid Strands.

Provide for herein are methods of producing covalently crosslinked nucleic acid strands. The methods comprise incubating a hybridized, double-stranded nucleic acid molecule that comprises: (i) a target strand comprising a 2'-deoxyguanosine (dG) to be crosslinked, referred to herein as the "target dG"; and (ii) an at least partially complementary probe strand comprising an abasic (Ap) residue. In certain embodiments, such method is performed for the purpose of detecting and/or identifying the presence of the target dG residue in the target strand. In certain embodiments, the probe strand, the target strand, or both the probe strand and the target strand, is a DNA molecule. And, in certain embodiments, the target strand comprises, consists essentially of, or consists of genomic or mitochondrial DNA such as from a biological sample taken from an organism. In the hybridized nucleic acid molecule, the Ap residue of the probe strand is at a position immediately 3' adjacent to the nucleotide residue in the probe strand that is directly opposite of the target dG in the target strand. For illustration, the double stranded nucleic acid sequence:

```
Probe strand
5' GCXGG 3'

Target strand
3' CGACC 5'.
```

The C residue in the probe strand (top) is directly opposite the target dG residue in the target strand (bottom) and the Ap residue in the probe strand (X) is immediately 3' adjacent to the C residue in the probe strand that is directly opposite the target dG residue in the target strand. The incubation of the hybridized, double-stranded nucleic acid molecule occurs under conditions, such as those described elsewhere in greater detail, that allow for a covalent cross link to form between the Ap residue of the probe strand and the target dG, thus producing covalently crosslinked nucleic acid strands. In certain embodiments, the incubation occurs in the presence of $NaCNBH_3$. In certain embodiments, the incubation occurs at a pH of less than or less than about pH 7, less or less than about pH 6.0, or less than or less than about pH 5.5 and optionally greater than or greater than about pH 4.5 or greater than or greater than about pH 5.0. For example, in certain embodiments, the incubation occurs at or at about pH 5.1, pH 5.2, or pH 5.3. In certain embodiments, the incubation occurs at between or between about 20° C. and 42° C. or any particular value in between, for example between or between about 24° C. and 37° C. or any particular value in between. In certain embodiments, the incubation occurs at or at about 24° C. or 37° C.

As noted herein, crosslinking of a hybridized nucleic acid molecule can increase its stability. Further, how the hybridized nucleic acid molecule is crosslinked can also result in distinguishable features. For example, in certain embodiments, a crosslinked, hybridized double-stranded molecule comprising a cross link between the Ap residue of the probe strand and the target dG residue of the target strand is distinguishable in terms of stability and/or gel mobility to an identical, hybridized double-stranded molecule that is also crosslinked except for having a dC, dA, or dT substitution at the target dG position of the target strand. For example, in certain embodiments, a crosslinked, hybridized double-stranded molecule comprising a cross link between the Ap residue of the probe strand and the target dG residue of the target strand is distinguishable in terms of stability and/or gel mobility to an identical, hybridized double-stranded molecule that is also crosslinked except for having a dC substitution at the target dG position of the target strand. Such a substitution may indicate a certain allele, either wild-type of mutant, of a gene including alleles that when identified could help to predict and/or diagnose certain diseases or disease states. In certain embodiments, the presence or absence of a dG residue in the target strand can be used to determine the potential resistance to treatment and/or best treatment options for a disease, cancer, tumor, etc. In certain embodiments, the method further comprises detecting covalent crosslinking of the probe strand and the target strand. In certain embodiments, the detection detects and/or identifies the presence of a dG residue in the target strand (target dG). In certain embodiments, the detection is by gel electrophoresis, monitoring of thermal stability, fluorescence methods (i.e., FRET), electrochemistry, surface plasmon resonance, or a nanopore-based sensor, optionally, wherein the detection is by a nanopore-based sensor. Such detection methods can provide a qualitative assessment of crosslink formation and/or the type of crosslink formation and in certain embodiments can also provide for quantitative detection of crosslink formation, including the type of crosslink formed.

Methods of Detecting the Presence or Absence of a dG Residue at a Particular Position in a Nucleic Acid Target Strand.

Provided for herein are methods of detecting the presence or absence of a dG residue at a particular position in a nucleic acid target strand (target dG). The methods comprise incubating a hybridized double-stranded nucleic acid molecule comprising: (i) a target strand; and (ii) an at least partially complementary probe strand that comprises an abasic (Ap) residue. In certain embodiments, the probe strand, the target strand, or both the probe strand and the target strand, is a DNA molecule. And, in certain embodiments, the target strand comprises genomic or mitochondrial DNA such as from a biological sample taken from an organism. As illustrated elsewhere herein, in the hybridized nucleic acid molecule, the Ap residue of the probe strand is at a position that is immediately 3' adjacent to the nucleotide residue in the probe strand that is directly opposite to the particular position in the target strand where the presence or absence of the target dG residue is to be detected. The incubation of the hybridized, double-stranded nucleic acid molecule occurs under conditions, such as those described elsewhere in greater detail, that allow for a covalent cross link to form between the Ap residue in the probe strand and the target dG residue in the target strand, if present. In certain embodiments, the incubation occurs in the presence of $NaCNBH_3$. In certain embodiments, the incubation occurs at a pH of less than or less than about pH 7, less or less than about pH 6.0, or less than or less than about pH 5.5 and optionally greater than or greater than about pH 4.5 or greater than or greater than about pH 5.0. For example, in certain embodiments, the incubation occurs at or at about pH 5.1, pH 5.2, or pH 5.3. In certain embodiments, the incubation occurs at between or between about 20° C. and 42° C. or any particular value in between, for example between or between about 24° C. and 37° C. or any particular value in between. In certain embodiments, the incubation occurs at or at about 24° C. or 37° C.

In certain embodiments, the method further comprises detecting whether crosslinking of the target and probe strands occurred, thereby detecting the presence (crosslinking of the Ap residue to the target dG occurred) or absence (crosslinking of the Ap residue to target dG did not occur) of the target dG residue at the particular position in the target strand. In certain embodiments, covalently crosslinking of the probe strand and the target strand is detected by gel electrophoresis, monitoring of thermal stability, fluorescence methods (i.e. FRET), electrochemistry, surface plasmon resonance, or a nanopore-based sensor, and optionally wherein covalently crosslinking of the probe strand and the target strand is detected by a nanopore-based sensor. Such detection methods can provide a qualitative assessment of crosslink formation and/or the type of crosslink formation and in certain embodiments can also provide for quantitative detection of crosslink formation, including the type of crosslink formed. In certain embodiments, a target dG is present at the particular position in the target strand and a covalent crosslink forms between the Ap residue in the probe strand and the target dG in the target strand. Thus, in certain embodiments, the method detects the presence of the dG residue in the target strand. In certain other embodiments, a target dG is not present at the particular position in the target strand and a covalent crosslink does not form between the Ap residue in the probe strand and a target dG. Thus, in certain embodiments, the method detects the absence of a dG residue in the target strand.

Methods of Detecting the Presence of a dG Residue in a Nucleic Acid Strand.

Provided for herein are methods of detecting the presence of a dG residue in a nucleic acid strand. The methods comprise incubating a hybridized, double-stranded nucleic acid molecule that comprises: (i) a target strand comprising a dG residue to be detected (target dG); and (ii) an at least partially complementary probe strand that comprises an abasic (Ap) residue. In certain embodiments, the probe strand, the target strand, or both the probe strand and the target strand, is a DNA molecule. In certain embodiments, the target strand is genomic or mitochondrial DNA such as from a biological sample taken from an organism. As illustrated elsewhere herein, in the hybridized nucleic acid molecule, the Ap residue of the probe strand is at a position immediately 3' adjacent to the nucleotide residue in the probe strand that is directly opposite of the target dG residue in the target strand. The incubation occurs under conditions, such as those described elsewhere in greater detail, that allow for a covalent cross link to form between the Ap residue in the probe strand and the target dG residue in the target strand. In certain embodiments, the incubation occurs in the presence of NaCNBH$_3$. In certain embodiments, the incubation occurs at a pH of less than or less than about pH 7, less or less than about pH 6.0, or less than or less than about pH 5.5 and optionally greater than or greater than about pH 4.5 or greater than or greater than about pH 5.0. For example, in certain embodiments, the incubation occurs at or at about pH 5.1, pH 5.2, or pH 5.3. In certain embodiments, the incubation occurs at between or between about 20° C. and 42° C. or any particular value in between, for example between or between about 24° C. and 37° C. or any particular value in between. In certain embodiments, the incubation occurs at or at about 24° C. or 37° C.

In certain embodiments the method further comprises detecting covalent crosslinking of the probe strand and target strand between the Ap residue in the probe strand and the target dG; thereby detecting the presence of the target dG residue in the target strand. In certain embodiments, covalent crosslinking of the probe strand and the target strand is detected by gel electrophoresis, monitoring of thermal stability, fluorescence methods (i.e. FRET), electrochemistry, surface plasmon resonance, or a nanopore-based sensor, and optionally wherein covalently crosslinking of the probe strand and the target strand is detected by a nanopore-based sensor. Such detection methods can provide a qualitative assessment of crosslink formation and/or the type of crosslink formation and in certain embodiments can also provide for quantitative detection of crosslink formation, including the type of crosslink formed.

Method of Detecting a Mutation in a Wild-Type Sequence.

Provided for herein are methods of detecting a mutation in a wild-type sequence. The methods comprise detecting the presence or absence of a target dG residue at a particular position in a target strand according to any of the methods and using the nucleic acids described above or anywhere else herein. In certain embodiments, the target dG residue is present at the particular position in the target strand and the mutation comprises a T→G, A→G, or C→G mutation. In certain other embodiments, the dG residue is absent at the particular position in the target strand and the mutation comprises an G→T, G→A, or G→C mutation.

In certain embodiments, the presence or absence of the dG residue in the target strand represents a disease relevant mutation, for example a cancer associated mutation. In certain embodiments, the presence or absence of a dG residue in the target strand can be used to determine the potential resistance to treatment and/or best treatment options for the disease, cancer, tumor, etc.

Covalently Crosslinked, Hybridized Double-Stranded Nucleic Acid Molecule.

Provided for herein are covalently crosslinked, hybridized double-stranded nucleic acid molecules. The molecules comprise a probe strand that comprises an abasic (Ap) residue and a target strand that comprises a 2'-deoxyadenosine (dG) residue, wherein as illustrated elsewhere herein, the Ap residue is at a position immediately 3' adjacent to the nucleotide residue in the probe strand that is directly opposite to the dG residue in the target strand and the Ap residue is covalently crosslinked to the dG residue in the target strand that is directly opposite to the nucleotide residue in the probe strand that is immediately 3' adjacent to the Ap residue. In certain embodiments, the nucleic acid molecule is isolated. In certain embodiments, the probe strand, the target strand, or both the probe strand and the target strand, is a DNA molecule. In certain embodiments, the target strand is genomic or mitochondrial DNA such as from a biological sample taken from an organism.

In certain embodiments of any of the methods and nucleic acids disclosed above and anywhere herein, the sequence immediately 5' and 3' flanking the Ap residue in the probe strand can be either fully complementary with the corresponding sequence in the target strand or it can be varied so that in the hybridized molecule certain opposing residues are mismatched and/or a bulge is formed in either the target strand or the probed strand. The sequence, region, segment, or the like immediately 5' and 3' flanking the Ap residue, including the Ap residue, in the probe strand can be defined as the 5, 6, 7, 8, or 9 nucleotide long segment of probe strand sequence that is 2, 3, or 4 nucleotides immediately 5' of the Ap residue to 2, 3, or 4 nucleotides immediately 3' of the Ap residue. For example, wherein X is the Ap residue of the probe strand and Y are the other residues of a 5 nucleotide long probe strand segment immediately 5' and 3' flanking the Ap residue, including the Ap residue, the sequence can be 5' YYXYY 3'. For example, wherein X is the Ap residue of the probe strand and Y are the other residues of a 6 nucleotide long probe strand segment immediately 5' and 3' flanking the Ap residue, including the Ap residue, the sequence can be 5' YYXYYY 3' or 5' YYYXYY 3'. For example, wherein X is the Ap residue of the probe strand and Y are the other residues of a 7 nucleotide long probe strand segment immediately 5' and 3' flanking the Ap residue, including the Ap residue, the sequence can be 5' YYYYYYY 3' or 5' YYYYXYY 3' or 5' YYXYYYY 3', etc. In certain embodiments, the sequence immediately 5' and 3' flanking the Ap residue, including the Ap residue, in the probe strand comprises, consists essentially of, or consists of: (i) fully complementary base-pairing between probe strand and the target strand, except for at the Ap residue position (e.g., Probe 1 disclosed elsewhere herein). In other embodiments, the sequence immediately 5' and 3' flanking the Ap residue in the probe strand comprises, consists essentially of, or consists of: (ii) a mispairing between the nucleotide residue immediately 5' of the Ap residue on the probe strand and the target dG (e.g., Probe 2 disclosed elsewhere herein), wherein in certain of such embodiments, the nucleotide residue immediately 5' of the Ap residue of the probe strand is A, T, or G; (iii) a mispairing between the nucleotide residue immediately 3' of the Ap residue of the probe strand and the directly opposite residue on the target strand (e.g., Probes 3, 4, and 5 disclosed elsewhere herein); (iv) a sequence that forms a bulge in the target strand (e.g., Probes 6, 7, and 8 disclosed elsewhere herein); and/or (v) a sequence that forms a bulge in the probe strand (e.g., Probes 9, 10, 11, and 12 disclosed elsewhere herein), wherein in certain of such embodiments, the probe strand sequence that forms a bulge in the probe strand comprises an insertion of a nucleotide immediately 3' adjacent to the Ap residue in the probe strand that does not have a corresponding residue in the target strand sequence, optionally, wherein the insertion is of an A. It has been discovered that in certain embodiments, the use of a probe strand sequence consistent with (ii), (iii), (iv), or (v) can provide a benefit over the use of a probe strand sequence with fully complementary base-pairing. In certain embodiments, such benefit may be an increase in the yield of the crosslinking reaction and/or an increase in selectivity for the Ap residue to target dG residue over other crosslink formation.

In certain embodiments of any of the methods and nucleic acids disclosed above and anywhere herein: (i) the target strand comprises at least 2, 3, 4, 5, 6, 7, 8, 9, 10, 11, 12, 15, 20, 25, 30, 40, or 50 nucleotides 5' of the target dG residue and at least 2, 3, 4, 5, 6, 7, 8, 9, 10, 11, 12, 15, 20, 25, 30, 40, or 50 nucleotides 3' of the target dG residue; and/or (ii) the probe strand comprises at least 2, 3, 4, 5, 6, 7, 8, 9, 10, 11, 12, 15, 20, 25, 30, 40, or 50 nucleotides 5' of the Ap residue and at least 2, 3, 4, 5, 6, 7, 8, 9, 10, 11, 12, 15, 20, 25, 30, 40, or 50 nucleotides 3' of the Ap residue. In certain embodiments: (i) the target strand comprises not more than 3, 4, 5, 6, 7, 8, 9, 10, 11, 12, 15, 20, 25, 30, 40, 50, or 100 nucleotides 5' of the target dG residue and not more than 3, 4, 5, 6, 7, 8, 9, 10, 11, 12, 15, 20, 25, 30, 40, 50, or 100 nucleotides 3' of the target dG residue; and/or (ii) the probe strand comprises not more than 3, 4, 5, 6, 7, 8, 9, 10, 11, 12, 15, 20, 25, 30, 40, 50, or 100 nucleotides 5' of the Ap residue and not more than 3, 4, 5, 6, 7, 8, 9, 10, 11, 12, 15, 20, 25, 30, 40, 50, or 100 nucleotides 3' of the Ap residue. In certain embodiments: (i) the target strand is at least or is at least about, is or is about, or between any or between any of about 12, 13, 14, 15, 16, 17, 18, 19, 20, 21, 22, 23, 24, 25, 26, 27, 28, 29, 30, 40, 50, 60, 70, 80, 90, or 100 nucleotides in length; (ii) the probe strand is less than or is less than about, is or is about, or between any or between any of about 100, 90, 80, 70, 60, 50, 40, 30, 29, 28, 27, 26, 25, 24, 23, 22, 21, 20, 19, 18, 17, 16, 15, 14, 13, or 12 nucleotides in length; and/or (iii) the hybridized nucleic acid molecule comprises a hybridized sequence portion containing the Ap residue of the probe strand and the target dG residue of the target strand, that is at least or at least about, is or is about, or between any or between any of about, 12, 13, 14, 15, 16, 17, 18, 19, 20, 21, 22, 23, 24, 25, 26, 27, 28, 29, 30, 40, 50, 60, 70, 80, 90, or 100 contiguous nucleotides in length. As noted herein, the probe strand is at least partially complementary to the target strand to allow for the probe strand and target strand to hybridize, particularly in the region immediately 5' and 3' flanking the Ap residue, including the Ap residue, in the probe strand and the region of the particular position of the target dG (whether present or absent) in the target strand. In certain embodiments, the hybridized portion containing the Ap residue of the probe strand and the target dG residue position of the target strand is at least or at least about, is or is about, or between any or between any of about 50%, 60%, 70%, 75%, 80%, 85%, 90%, 95%, 96%, 97%, 98%, or 99% complementary, or is 100% complementary, excluding the position of the Ap residue.

In certain embodiments of any of the methods and nucleic acids disclosed above and anywhere herein the probe strand and/or the target strand comprises a terminal extension that is covalently attached to the 5' end, the 3' end, or both the 5' end and the 3' end of the strand. In certain embodiments, the terminal extension is covalently attached to the 3' end of the strand and is selected from the group consisting of poly(dC)$_{(3-33)}$, poly(dG)$_{(3-33)}$, poly(dA)$_{(3-33)}$, poly(dT)$_{(3-33)}$, and poly(dN)$_{(3-33)}$, where N is any combination of 2'-deoxycytosine, 2'-deoxyguanosine, 2'-deoxyadenosine, thymine, an abase, inosine, xanthosine, 7-methylguanosine, dihydrouridine, or 5-methylcytidine.

In certain specific, non-limiting illustrative embodiments, the above described cross-linking reaction was applied to the detection of a DNA sequence corresponding to a C→G mutation at position 35 in the non-coding strand of the human KRAS gene sequence (nc35C>G, this mutation corresponds to the c35G→C transversion in the coding strand of the KRAS gene) (Riely, 2008). This genetic variant results in a cancer-driving G12A substitution in the KRAS protein (Knickelbein, 2015). It was discovered that the dG-AP cross-linking reaction can be employed for the selective covalent capture of the mutant KRAS sequence. Selective Covalent Capture of a Cancer-Driving KRAS Gene Sequence by Reaction of an AP-Containing Probe Strand with a Guanine Residue in the Target Strand.

Disclosed herein are probes in which the Ap site selectively cross-linked with the guanine mutation in the nc35C>G KRAS gene sequence. Probe sequence 1 (FIG. 1A and FIG. 2) was designed that positioned the Ap site 1 nt away from the target guanine residue in the probe-target complex. This design rested on a previous observation that the Ap aldehyde can forge a covalent cross-link with a guanine residue on the opposing strand offset 1 nt to the 5'-side of the Ap site (duplex A, FIG. 1) (Dutta, 2007; Johnson, 2013). This approach further recognized that inclusion of the water-compatible hydride reducing agent NaCNBH$_3$ in the cross-linking reaction had the potential to generate substantial (approximately 20%) yields of a chemically-stable dG-Ap interstrand cross-link via a reductive amination reaction (Scheme 1; FIG. 6) (Johnson, 2013). At the outset of the current studies, the scope and generality of this interstrand DNA cross-linking reaction was unknown, having been examined previously in only two different sequence contexts (Johnson, 2013; Dutta, 2007; and Imani-Nejad, 2019).

A 21 nt, 5'-$^{32}$P-labeled probe strand 1 was prepared containing the reactive Ap site by treatment of the corresponding 2'-deoxyuracil-containing oligonucleotide with the enzyme uracil DNA glycosylase (UDG) (Varshney, 1991; Lindahl, 1977; and Stuart, 1987). Installation of the Ap residue in the probes was confirmed by piperidine-induced cleavage at the Ap site to generate a short 10 nt 32P-labeled fragment (FIG. 1A, lanes 2). (McHugh, 1995; Stuart, 1987). The 5'-$^{32}$P-labeled, AP-containing probe strand was incubated with the mutant KRAS target sequence in sodium acetate buffer (0.75 M, pH 5.2) containing NaCNBH$_3$ (200 mM) followed by electrophoretic analysis of the $^{32}$P-labeled products on a denaturing 20% polyacrylamide gel. The cross-linked, 21 bp probe-target complex was detected as a characteristic (Dutta, 2007; Johnson, 2013; Hartley, 1993) slowly-migrating band in 7.2±0.9% yield (FIG. 1A). Incubation of the AP-containing probe strand with the wild-type (WT) KRAS sequence generated a slowly-migrating cross-link band in substantially lower yield (1.7±1.1%). Thus, probe 1 provided a 4.2-fold higher signal for the mutant sequence (duplex A, FIG. 1A) over that for the WT sequence (duplex B, FIG. 1A) and a 5.5% difference in cross-link yields between mutant and WT sequences. The origin of the background signal arising from cross-link generation in duplexes lacking the target guanine residue is discussed further below.

Probe Sequences that Introduce Mispairs into the Probe-Target Complex can Improve Selectivity and Yield for Covalent Capture of the Mutant KRAS Sequence.

Based on the observed selective detection of mutant KRAS sequence by the AP-containing probe 1, it was theorized that alterations in the sequence of the probe that formally introduce non-canonical structures such as mispairs and bulges into the probe-target complex would improve the selectivity and yield of covalent cross-link formation with the mutant KRAS target sequence. Also, it had been previously shown that a mispair in the probe-target complex dramatically improved the ability of an AP-containing probe strand to selectively detect a T→A mutation in the BRAF gene sequence (Imani-Nejad, 2017). The performance of the AP-containing probe 2 that generates a G/A mispair with the target guanine residue in the probe-mutant complex (duplex C, FIG. 2) was first examined. This alteration in the Ap probe sequence, however, dramatically decreased both the yield and selectivity in the detection of the mutant KRAS sequence (4.2±0.6% cross-link yield with mutant and 2.6±0.4% yield for WT sequence). The effects of mispairs located on the 3'-side of the Ap site, distal to the target guanine residue in the mutant sequence (probes 3-5) was next examined. It was found that mispairs in this location markedly improved both yield and selectivity for cross-linking of the probe to the mutant versus WT sequence (duplexes E-J, FIG. 2). Within this series, the best performance was obtained with probe 5 that generates an A/C mispair (36.1±1.2% cross-link yield in probe-mutant duplex I, 5.1±0.4% yield with probe-WT duplex J, corresponding to a 7.1-fold selectivity for target sequence, and a 31% difference in cross-link yields between mutant and WT sequences).

Selectivity and Yield for Covalent Capture of the Mutant KRAS Sequence Achieved by an AP-Containing Probe Strand that Introduces a Formal Bulge into the Probe-Target Complex.

The performance of AP-containing probes 6 and 7 was examined, with one or two base deletions that lead to the formal generation of 1 nt or 2 nt bulges on the target strand in the probe-target complexes (duplexes K-N, FIG. 3). These probes generated cross-link in good yield and with good selectivity for the mutant KRAS mutant sequence over WT, though both yields and selectivity were inferior to that provided by the best 3'-mismatch probe discussed above (FIG. 2, probe 5, duplexes I/J). Probe 8, designed to generate both a bulge and a mispair the probe-target complexes (duplexes O/P, FIG. 3), provided cross-link yields and selectivity similar to the probe that generates a formal 2 nt bulge on the target strand in the probe-target complexes (duplexes M/N, FIG. 3).

A series of AP-containing probes 9-12 were examined with base insertions that formally introduce a bulge on the probe strand in the probe-target complexes (FIG. 4). With the insertion of a T, C, or G into the probe, the yields of cross-link formed with the mutant KRAS sequence were modest and the selectivities for mutant over WT sequence rather poor (duplexes Q-V, FIG. 4). On the other hand, the insertion of an A residue into the probe (duplexes W/X) provided the best overall yield for probe-mutant cross-link formation (57.7±1%), good selectivity (5.7-fold), and large yield difference (48%) over that generated with the WT sequence. Representative gel electrophoretic analysis of this cross-linking reaction is shown in FIG. 1B.

Probe Captures Mutant KRAS Sequence Via a Rapid Reaction with the Mutant Guanine Residue at Position 35 and does not Require Strict Temperature Control.

Several key features of cross-link generation by probe 12 in duplexes W and X were examined. Iron-EDTA footprinting experiments (Luce, 2001; Johnson, 2013) pinpointed the location of the cross-link attachment the probe-mutant duplex at the guanine mutation in the nc35C>G sequence (FIG. 10). The reductive amination reaction rapidly generates cross-link in duplex W, giving >40% yield within 4 h and reaching a final yield of approximately 58% in about 8 h (FIG. 11). The cross-linking reaction in duplex W is better at pH 5.2 as opposed to pH 7, both in terms of signal intensity (yield) and selectivity for the mutant sequence over WT (FIG. 12). This type of pH dependence is typical for a reductive amination reaction (Borch, 1972). It was further demonstrate demonstrated that strict temperature control is not required for the successful use of these probes. Specifically, it was shown that the yield and selectivity of probe 12 for mutant over WT sequence were comparable when the reaction was carried out at either 37° C. (standard conditions above) or room temperature (24° C.; FIG. 4).

Also considered was the origin of the "background" cross-link that is generated in the WT duplex X lacking a target G residue at position 35. It was thought that the cross-link in duplex X may arise from a distinct process involving low yield reaction between the Ap site and the directly opposing A residue (Price, 2014). Indeed, iron-EDTA fooprinting reactions on the isolated cross-link generated in duplex X provided evidence for this supposition (FIG. 13).

Simultaneous Quantitative Detection of Both Mutant and Wild-Type KRAS Sequences in Mixtures.

Disclosed herein is the ability to selectively capture (e.g., with probe 12) the mutant KRAS sequence in mixtures containing varying fractions of the mutant and WT sequences. It is demonstrated that the cross-linked duplexes resulting from reaction of the probe with mutant and WT sequences can be cleanly separated by gel electrophoresis (FIG. 5A). This was accomplished by running the cross-linked duplexes farther into the gel. Under these experimental conditions, the relative amounts of mutant and WT KRAS sequences in the mixture can be separately and simultaneously measured using gel electrophoresis (FIG.

5B). Separation of the signals arising from cross-link formation with the mutant and WT sequences enables detection of the mutant KRAS target sequence, with no significant background signal (FIG. 5B).

Disclosed above is thus a new hybridization-induced, programmable cross-linking reaction for sequence-selective covalent capture of nucleic acids. The reactive, cross-linking probes are prepared in a simple, one-step procedure from inexpensive commercial reagents and achieve exquisite specificity for a particular target sequence under isothermal assay conditions that do not require strict temperature control. The utility of these chemically reactive AP-containing probes was demonstrated for the covalent capture of a DNA sequence corresponding to a nc35C>G mutation in the human KRAS gene sequence. The covalent cross-linking reaction generates a chemically-stable, probe-target complex that is immune to thermal denaturation (Johnson, 2013; Catalano, 2015; Imani-Nejad, 2019). In particular, introduction of non-canonical mispairs and bulged structures into the probe-target duplexes significantly improved performance with respect to both signal intensity (yield) and selectivity toward the mutant KRAS sequence over the wild-type sequence. Gel electrophoretic analysis of certain abasic site-containing probes enabled simultaneous quantitative detection of both mutant and wild-type KRAS sequences in mixtures with no background interference (FIG. 5). While the three-dimensional structures of these probe-target duplexes are not known, mispairs and bulges produce dynamic complexes (Rossetti, 2015; John, 2004) that presumably can better accommodate distortions required for covalent cross-link formation. Here, a $^{32}$P-labeled probe strand, gel electrophoretic analysis, and phosphorimaging wer used to detect the cross-linked probe-target complexes; however, it is contemplated that such sequence selective covalent capture could be adapted for use with other methods including capillary electrophoresis (Durney, 2015), nanopore technology (Zhang, 2015; Shi, 2018; Imani-Nejad, 2017), fluorescence spectrometry (Silverman, 2006; Demidov, 2004), UV-vis spectrometry (Alexandre, 2001), and/or electrochemical detection (Li, 2006).

Embodiment Paragraphs

Paragraph 1. A method of producing covalently cross-linked nucleic acid strands, the method comprising incubating a hybridized, double-stranded nucleic acid molecule that comprises: (i) a target strand comprising a segment of a nc35C>G mutant human KRAS gene sequence that comprises the mutant G nucleotide residue of the nc35C>G mutation; and (ii) an at least partially complementary probe strand comprising an abasic (Ap) residue, wherein, in the hybridized nucleic acid molecule, the Ap residue of the probe strand is at a position immediately 3' adjacent to the nucleotide residue in the probe strand that is directly opposite of the mutant G nucleotide residue of the nc35C>G mutation, and wherein incubation occurs under conditions that allow for a covalent cross link to form between the Ap residue of the probe strand and the mutant G nucleotide residue of the nc35C>G mutant KRAS gene sequence; thus producing covalently crosslinked nucleic acid strands; optionally, wherein the probe strand, the target strand, or both the probe strand and the target strand, is a DNA molecule; optionally, wherein the target strand comprises genomic or mitochondrial DNA; optionally, wherein the incubation occurs in the presence of NaCNBH$_3$; and/or optionally, wherein the incubation occurs at a pH of less than or less than about pH 7, less or less than about pH 6.0, or less than or less than about pH 5.5 and optionally greater than or greater than about pH 4.5 or greater than or greater than about pH 5.0; and optionally, wherein the incubation occurs at or at about pH 5.1, pH 5.2, or pH 5.3.

Paragraph 2. The method of Paragraph 1, wherein the sequence of probe strand, that hybridizes to the region of the nc35C>G mutation sequence in the target strand, comprises: 5' GCXGG; 5' GAXGG; 5' GCXTG; 5' GCXCG; 5' GCXAG; 5' GCXGC; 5' GCXCG; 5' GCXAC; 5' GCXTGG; 5' GCXCGG; 5' GCXGGG; or 5' GCXAGG, wherein X is the Ap residue, and wherein in the hybridized molecule, the Ap residue of the probe strand is at a position immediately 3' adjacent to the nucleotide residue in the probe strand that is directly opposite of the mutant G nucleotide residue of the nc35C>G mutation; optionally, wherein the sequence of probe strand, that hybridizes to the region of the nc35C>G mutation sequence in the target strand, comprises: 5' GCXTGG; 5' GCXCGG; 5' GCXGGG; or 5' GCXAGG; and optionally, wherein the sequence of probe strand, that hybridizes to the region of the nc35C>G mutation sequence in the target strand, comprises 5' GCXAGG.

Paragraph 3. The method of Paragraph 1 or 2, wherein: (i) the target strand comprises at least 2, 3, 4, 5, 6, 7, 8, 9, 10, 11, 12, 15, 20, 25, 30, 40, or 50 nucleotides 5' of the mutant G nucleotide residue of the nc35C>G mutation and at least 2, 3, 4, 5, 6, 7, 8, 9, 10, 11, 12, 15, 20, 25, 30, 40, or 50 nucleotides 3' of the mutant G nucleotide residue of the nc35C>G mutation; and/or (ii) the probe strand comprises at least 2, 3, 4, 5, 6, 7, 8, 9, 10, 11, 12, 15, 20, 25, 30, 40, or 50 nucleotides 5' of the Ap residue and at least 2, 3, 4, 5, 6, 7, 8, 9, 10, 11, 12, 15, 20, 25, 30, 40, or 50 nucleotides 3' of the Ap residue; optionally, wherein: (i) the target strand comprises not more than 3, 4, 5, 6, 7, 8, 9, 10, 11, 12, 15, 20, 25, 30, 40, 50, or 100 nucleotides 5' of the mutant G nucleotide residue of the nc35C>G mutation and not more than 3, 4, 5, 6, 7, 8, 9, 10, 11, 12, 15, 20, 25, 30, 40, 50, or 100 nucleotides 3' of the mutant G nucleotide residue of the nc35C>G mutation; and/or (ii) the probe strand comprises not more than 3, 4, 5, 6, 7, 8, 9, 10, 11, 12, 15, 20, 25, 30, 40, 50, or 100 nucleotides 5' of the Ap residue and not more than 3, 4, 5, 6, 7, 8, 9, 10, 11, 12, 15, 20, 25, 30, 40, 50, or 100 nucleotides 3' of the Ap residue.

Paragraph 4. The method of Paragraph 3, wherein: (i) the target strand is at least or is at least about, is or is about, or between any or between any of about 12, 13, 14, 15, 16, 17, 18, 19, 20, 21, 22, 23, 24, 25, 26, 27, 28, 29, 30, 40, 50, 60, 70, 80, 90, or 100 nucleotides in length;
 (ii) the probe strand is less than or is less than about, is or is about, or between any or between any of about 100, 90, 80, 70, 60, 50, 40, 30, 29, 28, 27, 26, 25, 24, 23, 22, 21, 20, 19, 18, 17, 16, 15, 14, 13, or 12 nucleotides in length; and/or (iii) the hybridized nucleic acid molecule comprises a hybridized sequence portion containing the Ap residue of the probe strand and the mutant G nucleotide residue of the nc35C>G mutation of the target strand, that is at least or at least about, is or is about, or between any or between any of about, 12, 13, 14, 15, 16, 17, 18, 19, 20, 21, 22, 23, 24, 25, 26, 27, 28, 29, 30, 40, 50, 60, 70, 80, 90, or 100 contiguous nucleotides in length.

Paragraph 5. The method of Paragraph 4, wherein the hybridized portion containing the Ap residue of the probe strand and the mutant G nucleotide residue of the nc35C>G mutation of the target strand is at least or at least about, is or is about, or between any or between any of about 50%, 60%, 70%, 75%, 80%, 85%, 90%, 95%, 96%, 97%, 98%, or 99% complementary, or is 100% complementary, excluding the position of the Ap residue.

Paragraph 6. The method of Paragraph 1, wherein the probe strand comprises, consists essentially of, or consists of SEQ ID NO: 3 or a fragment thereof comprising 5' GCXGG; SEQ ID NO: 4 or a fragment thereof comprising 5' GAXGG; SEQ ID NO: 5 or a fragment thereof comprising 5' GCXTG; SEQ ID NO: 6 or a fragment thereof comprising 5' GCXCG; SEQ ID NO: 7 or fragment thereof comprising 5' GCXAG; SEQ ID NO: 8 or a fragment thereof comprising 5' GCXGC; SEQ ID NO: 9 or a fragment thereof comprising 5' GCXCG; SEQ ID NO: 10 or a fragment thereof comprising 5' GCXAC; SEQ ID NO: 11 or a fragment thereof comprising 5' GCXTGG; SEQ ID NO: 12 of a fragment thereof comprising 5' GCXCGG; SEQ ID NO: 13 or a fragment thereof comprising 5' GCXGGG; or SEQ ID NO: 14 or a fragment thereof comprising 5' GCXAGG, wherein X is the Ap residue; optionally, wherein the probe strand comprises, consists essentially of, or consists of the sequence TTGGAGCTGCXAGGCGTAGGCA (SEQ ID NO: 14) or a fragment thereof comprising 5' GCXAGG.

Paragraph 7. The method of any one of Paragraphs 1 to 6, wherein the yield of covalently crosslinked nucleic acid strands produced by the method is greater in comparison to the yield of covalently crosslinked nucleic acid strands produced by the method except wherein the target strand comprises a wild-type human KRAS gene sequence instead of the nc35C>G mutation sequence.

Paragraph 8. The method of any one of Paragraphs 1 to 7, wherein the yield of covalently crosslinked nucleic acid strands obtained and/or the selectivity over a wild-type KRAS gene sequence observed from use of a probe strand that comprises 5' GAXGG; 5' GCXTG; 5' GCXCG; 5' GCXAG; 5' GCXGC; 5' GCXCG; 5' GCXAC; 5' GCXTGG; 5' GCXCGG; 5' GCXGGG; or 5' GCXAGG is greater in comparison to use of an equivalent probe strand that comprises 5' GCXGG; optionally, wherein the yield of covalently crosslinked nucleic acid strands obtained and/or the selectivity over a wild-type KRAS gene sequence observed from use of a probe strand that comprises, consists essentially of, or consists of the sequence of SEQ ID NO: 4 or a fragment thereof comprising 5' GAXGG; SEQ ID NO: 5 or a fragment thereof comprising 5' GCXTG; SEQ ID NO: 6 or a fragment thereof comprising 5' GCXCG; SEQ ID NO: 7 or fragment thereof comprising 5' GCXAG; SEQ ID NO: 8 or a fragment thereof comprising 5' GCXGC; SEQ ID NO: 9 or a fragment thereof comprising 5' GCXCG; SEQ ID NO: 10 or a fragment thereof comprising 5' GCXAC; SEQ ID NO: 11 or a fragment thereof comprising 5' GCXTGG; SEQ ID NO: 12 of a fragment thereof comprising 5' GCXCGG; SEQ ID NO: 13 or a fragment thereof comprising 5' GCXGGG; or SEQ ID NO: 14 or a fragment thereof comprising 5' GCXAGG is greater in comparison to use of an equivalent probe strand that comprises, consists essentially of, or consists of the sequence of SEQ ID NO: 3 or a fragment thereof comprising 5' GCXGG.

Paragraph 9. A method of detecting the presence of a nc35C>G cancer-driving mutation in a human KRAS gene, the method comprising incubating a hybridized, double-stranded DNA molecule (dsDNA) that comprises: (i) a target strand comprising a segment of a KRAS gene sequence that comprises a nucleotide residue that corresponds to residue 35 in the coding strand of the human KRAS gene (SEQ ID NO: 15); and (ii) an at least partially complementary probe strand that comprises an abasic (Ap) residue, wherein, in the hybridized molecule, the Ap residue of the probe strand is at a position immediately 3' adjacent to the nucleotide residue in the probe strand that is directly opposite of the nucleotide residue in the target strand that corresponds to residue 35 in the coding strand of the human KRAS gene (SEQ ID NO: 15), and wherein incubation occurs under conditions that allow for a covalent cross link to form between the Ap residue in the probe strand and a mutant G nucleotide residue in a nc35C>G KRAS mutant gene if present, and detecting covalent crosslinking of the probe strand and target strand between the Ap residue in the probe strand and a mutant G nucleotide residue in a nc35C>G KRAS mutant gene, thus detecting the presence of the mutation in the KRAS gene; optionally, wherein the formation of the covalent cross link between the Ap residue in the probe strand and mutant G nucleotide residue in the KRAS mutant gene occurs selectively in comparison to a C nucleotide residue at the same position in a wild-type KRAS gene; optionally, wherein the target strand is genomic or mitochondrial DNA; optionally, wherein covalent crosslinking of the probe strand and the target strand is detected by gel electrophoresis, monitoring of thermal stability, fluorescence methods (i.e. FRET), electrochemistry, surface plasmon resonance, or a nanopore-based sensor; optionally, wherein the incubation occurs in the presence of $NaCNBH_3$; and/or optionally, wherein the incubation occurs at a pH of less than or less than about pH 7, less or less than about pH 6.0, or less than or less than about pH 5.5 and optionally greater than or greater than about pH 4.5 or greater than or greater than about pH 5.0; and optionally, wherein the incubation occurs at or at about pH 5.1, pH 5.2, or pH 5.3.

Paragraph 10. The method of Paragraph 9, wherein the detection of covalent crosslinking of the probe strand and target strand comprising the mutant G nucleotide residue of a nc35C>G KRAS mutant gene is compared to the detection of covalent crosslinking of the probe strand and target strand comprising the C nucleotide residue of a wild-type KRAS gene; optionally, wherein the formation and/or detection of the crosslinked probe-mutant target strand molecule and the crosslinked probe-wild-type target strand molecule is done simultaneously; optionally, wherein the formation and/or detection of the probe-mutant target strand and the probe-wild-type target strand is done within the same sample; and/or optionally, wherein the detection and/or comparison is done quantitatively.

Paragraph 11. The method of Paragraph 9 or 10, wherein the sequence of probe strand, that hybridizes to the region of the nucleotide residue of the target strand that corresponds to residue 35 in the coding strand of the KRAS gene (SEQ ID NO: 15), comprises: 5' GCXGG; 5' GAXGG; 5' GCXTG; 5' GCXCG; 5' GCXAG; 5' GCXGC; 5' GCXCG; 5' GCXAC; 5' GCXTGG; 5' GCXCGG; 5' GCXGGG; or 5' GCXAGG, wherein X is the Ap residue, wherein in the hybridized molecule, the Ap residue of the probe strand is at a position immediately 3' adjacent to the nucleotide residue in the probe strand that is directly opposite of the nucleotide residue of the target strand that corresponds to residue 35 in the coding strand of the KRAS gene (SEQ ID NO: 15); optionally, wherein the sequence of probe strand, that hybridizes to the region of the nucleotide residue of the target strand that corresponds to residue 35 in the coding strand of the KRAS gene (SEQ ID NO: 15), comprises: 5' GCXTGG; 5' GCXCGG; 5' GCXGGG; or 5' GCXAGG; and optionally, wherein the sequence of probe strand, that hybridizes to the region of the nucleotide residue of the target strand that corresponds to residue 35 in the coding strand of the human KRAS gene (SEQ ID NO: 15), comprises 5' GCXAGG.

Paragraph 12. The method of any one of Paragraph s 9 to 11, wherein: (i) the target strand comprises at least 2, 3, 4, 5, 6, 7, 8, 9, 10, 11, 12, 15, 20, 25, 30, 40, or 50 nucleotides 5' of the nucleotide residue that corresponds to residue 35 in the coding strand of the KRAS gene (SEQ ID NO: 15) and at least 2, 3, 4, 5, 6, 7, 8, 9, 10, 11, 12, 15, 20, 25, 30, 40, or 50 nucleotides 3' of the nucleotide residue that corresponds to residue 35 in the coding strand of the KRAS gene (SEQ ID NO: 15); and/or (i) the probe strand comprises at least 2, 3, 4, 5, 6, 7, 8, 9, 10, 11, 12, 15, 20, 25, 30, 40, or 50 nucleotides 5' of the Ap residue and at least 2, 3, 4, 5, 6, 7, 8, 9, 10, 11, 12, 15, 20, 25, 30, 40, or 50 nucleotides 3' of the Ap residue; optionally, wherein: (i) the target strand comprises not more than 3, 4, 5, 6, 7, 8, 9, 10, 11, 12, 15, 20, 25, 30, 40, 50, or 100 nucleotides 5' of the nucleotide residue that corresponds to residue 35 in the coding strand of the KRAS gene (SEQ ID NO: 15) and not more than 3, 4, 5, 6, 7, 8, 9, 10, 11, 12, 15, 20, 25, 30, 40, 50, or 100 nucleotides 3' of the nucleotide residue that corresponds to residue 35 in the coding strand of the KRAS gene (SEQ ID NO: 15); and/or (ii) the probe strand comprises not more than 3, 4, 5, 6, 7, 8, 9, 10, 11, 12, 15, 20, 25, 30, 40, 50, or 100 nucleotides 5' of the Ap residue and not more than 3, 4, 5, 6, 7, 8, 9, 10, 11, 12, 15, 20, 25, 30, 40, 50, or 100 nucleotides 3' of the Ap residue.

Paragraph 13. The method of Paragraph 12, wherein: (i) the target strand is at least or is at least about, is or is about, or between any or between any of about 12, 13, 14, 15, 16, 17, 18, 19, 20, 21, 22, 23, 24, 25, 26, 27, 28, 29, 30, 40, 50, 60, 70, 80, 90, or 100 nucleotides in length; (ii) the probe strand is less than or is less than about, is or is about, or between any or between any of about 100, 90, 80, 70, 60, 50, 40, 30, 29, 28, 27, 26, 25, 24, 23, 22, 21, 20, 19, 18, 17, 16, 15, 14, 13, or 12 nucleotides in length; and/or (iii) the hybridized nucleic acid molecule comprises a hybridized portion containing the Ap residue of the probe strand and the nucleotide residue of the target strand that corresponds to residue 35 in the coding strand of the human KRAS gene (SEQ ID NO: 15), that is at least or at least about, is or is about, or between any or between any of about, 12, 13, 14, 15, 16, 17, 18, 19, 20, 21, 22, 23, 24, 25, 26, 27, 28, 29, 30, 40, 50, 60, 70, 80, 90, or 100 contiguous nucleotides in length.

Paragraph 14. The method of Paragraph 13, wherein the hybridized portion containing the Ap residue of the probe strand and the nucleotide residue of the target strand that corresponds to residue 35 in the coding strand of the human KRAS gene (SEQ ID NO: 15), is at least or at least about, is or is about, or between any or between any of about 50%, 60%, 70%, 75%, 80%, 85%, 90%, 95%, 96%, 97%, 98%, or 99% complementary, or is 100% complementary, excluding the position of the Ap residue.

Paragraph 15. The method of Paragraph 9, wherein the probe strand comprises, consists essentially of, or consists of SEQ ID NO: 3 or a fragment thereof comprising 5' GCXGG; SEQ ID NO: 4 or a fragment thereof comprising 5' GAXGG; SEQ ID NO: 5 or a fragment thereof comprising 5' GCXTG; SEQ ID NO: 6 or a fragment thereof comprising 5' GCXCG; SEQ ID NO: 7 or fragment thereof comprising 5' GCXAG; SEQ ID NO: 8 or a fragment thereof comprising 5' GCXGC; SEQ ID NO: 9 or a fragment thereof comprising 5' GCXCG; SEQ ID NO: 10 or a fragment thereof comprising 5' GCXAC; SEQ ID NO: 11 or a fragment thereof comprising 5' GCXTGG; SEQ ID NO: 12 of a fragment thereof comprising 5' GCXCGG; SEQ ID NO: 13 or a fragment thereof comprising 5' GCXGGG; or SEQ ID NO: 14 or a fragment thereof comprising 5' GCXAGG, wherein X is the Ap residue; optionally, wherein the probe strand comprises, consists essentially of, or consists of the sequence TTG-GAGCTGCXAGGCGTAGGCA (SEQ ID NO: 14) or a fragment thereof comprising 5' GCXAGG.

Paragraph 16. The method of any one of Paragraphs 9 to 15, wherein the yield of covalently crosslinked nucleic acid strands obtained and/or the selectivity over a wild-type KRAS gene sequence observed from use of a probe strand that comprises 5' GAXGG; 5' GCXTG; 5' GCXCG; 5' GCXAG; 5' GCXGC; 5' GCXCG; 5' GCXAC; 5' GCXTGG; 5' GCXCGG; 5' GCXGGG; or 5' GCXAGG is greater in comparison to use of an equivalent probe strand that comprises 5' GCXGG; optionally, wherein the yield of covalently crosslinked nucleic acid strands obtained and/or selectivity over a wild-type KRAS gene sequence observed from use of a probe strand that comprises, consists essentially of, or consists of the sequence SEQ ID NO: 4; SEQ ID NO: 5; SEQ ID NO: 6; SEQ ID NO: 7; SEQ ID NO: 8; SEQ ID NO: 9; SEQ ID NO: 10; SEQ ID NO: 11; SEQ ID NO: 12; SEQ ID NO: 13; or SEQ ID NO: 14 is greater in comparison to use of an equivalent probe strand that comprises, consists essentially of, or consists of the sequence SEQ ID NO: 3.

Paragraph 17. A single-stranded nucleic acid probe for detecting a nc35C>G mutation in a human KRAS gene sequence, the probe comprising the sequence: 5' GCXGG; 5' GAXGG; 5' GCXTG; 5' GCXCG; 5' GCXAG; 5' GCXGC; 5' GCXCG; 5' GCXAC; 5' GCXTGG; 5' GCXCGG; 5' GCXGGG; or 5' GCXAGG, wherein X is the Ap residue, optionally, wherein the probe comprises the sequence: 5' GCXTGG; 5' GCXCGG; 5' GCXGGG; or 5' GCXAGG; optionally, wherein the probe comprises the sequence 5' GCXAGG; and/or optionally, wherein the probe is a DNA molecule.

Paragraph 18. The probe of Paragraph 17, wherein the probe comprises at least 2, 3, 4, 5, 6, 7, 8, 9, 10, 11, 12, 15, 20, 25, 30, 40, or 50 nucleotides 5' of the Ap residue and at least 2, 3, 4, 5, 6, 7, 8, 9, 10, 11, 12, 15, 20, 25, 30, 40, or 50 nucleotides 3' of the Ap residue; optionally, wherein the probe comprises not more than 3, 4, 5, 6, 7, 8, 9, 10, 11, 12, 15, 20, 25, 30, 40, 50, or 100 nucleotides 5' of the Ap residue and not more than 3, 4, 5, 6, 7, 8, 9, 10, 11, 12, 15, 20, 25, 30, 40, 50, or 100 nucleotides 3' of the Ap residue.

Paragraph 19. The probe of Paragraph 17 or 18, wherein the probe is less than or is less than about, is or is about, or between any or between any of about 100, 90, 80, 70, 60, 50, 40, 30, 29, 28, 27, 26, 25, 24, 23, 22, 21, 20, 19, 18, 17, 16, 15, 14, 13, or 12 nucleotides in length.

Paragraph 20. The probe of any one of Paragraphs 17 to 19, wherein the probe is capable of hybridizing to the region of a nc35C>G mutant human KRAS gene sequence comprising the nc35C>G mutation; optionally, wherein the probe strand comprises a contiguous sequence of at least 5, 6, 7, 8, 9, 10, 11, 12, 13, 14, 15, 16, 18, 20, 25, 30, 40, or 50 nucleotides that is at least or at least about, is or is about, or between any or between any of about 50%, 60%, 70%, 75%, 80%, 85%, 90%, 95%, 96%, 97%, 98%, or 99% complementary, or is 100% complementary, excluding the position of the Ap residue, to a nc35C>G mutant human KRAS gene sequence that comprises the nc35C>G point mutation site.

Paragraph 21. The probe of any one of Paragraphs 17 to 20, wherein the probe comprises, consists essentially of, or consists of SEQ ID NO: 3 or a fragment thereof comprising 5' GCXGG; SEQ ID NO: 4 or a fragment thereof comprising 5' GAXGG; SEQ ID NO: 5 or a fragment thereof comprising 5' GCXTG; SEQ ID NO: 6 or a fragment thereof comprising 5' GCXCG; SEQ ID NO: 7 or fragment thereof comprising 5' GCXAG; SEQ ID NO: 8 or a fragment thereof comprising 5' GCXGC; SEQ ID NO: 9 or a fragment thereof comprising 5' GCXCG; SEQ ID NO: 10 or a fragment thereof comprising 5' GCXAC; SEQ ID NO: 11 or a fragment thereof comprising 5' GCXTGG; SEQ ID NO: 12 of a fragment thereof comprising 5' GCXCGG; SEQ ID NO: 13 or a fragment thereof comprising 5' GCXGGG; or SEQ ID NO: 14 or a fragment thereof comprising 5' GCXAGG, wherein X is the Ap residue; optionally, wherein the probe comprises, consists essentially of, or consists of the sequence TTG-GAGCTGCXAGGCGTAGGCA (SEQ ID NO: 14) or a fragment thereof comprising 5' GCXAGG.

Paragraph 22. The probe of any one of Paragraphs 17 to 21, wherein the probe comprises a detectable label; optionally, wherein the probe is radiolabeled and optionally, wherein the radiolabel is 32P; or optionally, wherein the probe comprises a terminal extension that is covalently attached to the 5' end, the 3' end, or both the 5' end and the 3' end of the probe; and optionally, wherein the terminal extension is covalently attached to the 3' end of the probe and is selected from the group consisting of poly(dC)(3-33), poly(dG)(3-33), poly(dA)(3-33), poly(dT)(3-33), and poly(dN)(3-33), where N is any combination of 2'-deoxycytosine, 2'-deoxyguanosine, 2'-deoxyadenosine, thymine, an abase, inosine, xanthosine, 7-methylguanosine, dihydrouridine, or 5-methylcytidine.

Paragraph 23. A covalently crosslinked, hybridized double-stranded nucleic acid molecule, comprising: (i) a target strand comprising a segment of a nc35C>G mutant human KRAS gene sequence that comprises the mutant G nucleotide residue of the nc35C>G point mutation site; and (ii) an at least partially complementary probe strand comprising an abasic (Ap) residue, wherein, in the hybridized molecule, the Ap residue of the probe strand is at a position immediately 3' adjacent to the nucleotide residue in the probe strand that is directly opposite of the mutant G nucleotide residue of the nc35C>G point mutation; wherein the Ap residue of the probe strand is covalent crosslinked the mutant G nucleotide residue of the nc35C>G mutant KRAS gene sequence; optionally, wherein the nucleic acid molecule is isolated.

Paragraph 24. The crosslinked nucleic acid molecule of Paragraph 23, wherein the probe strand, the target strand, or both the probe strand and the target strand, is a DNA molecule; optionally, wherein the target strand is genomic or mitochondrial DNA.

Paragraph 25. The crosslinked nucleic acid molecule of Paragraph 24, wherein the sequence of probe strand that hybridizes to the region of the nc35C>G point mutation site in the target strand comprises: 5' GCXGG; 5' GAXGG; 5' GCXTG; 5' GCXCG; 5' GCXAG; 5' GCXGC; 5' GCXCG; 5' GCXAC; 5' GCXTGG; 5' GCXCGG; 5' GCXGGG; or 5' GCXAGG, wherein X is the Ap residue, and wherein in the hybridized molecule, the Ap residue of the probe strand is at a position immediately 3' adjacent to the nucleotide residue in the probe strand that is directly opposite of the G nucleotide residue of the nc35C>G point mutation; optionally, wherein the sequence of probe strand that hybridizes to the region of the nc35C>G point mutation site in the target strand comprises: 5' GCXTGG; 5' GCXCGG; 5' GCXGGG; or 5' GCXAGG; and optionally, wherein the sequence of probe strand that hybridizes to the region of the nc35C>G point mutation site in the target strand comprises 5' GCX-AGG.

Paragraph 26. The crosslinked nucleic acid molecule of Paragraph 24 or 25, wherein: (i) the target strand comprises at least 2, 3, 4, 5, 6, 7, 8, 9, 10, 11, 12, 15, 20, 25, 30, 40, or 50 nucleotides 5' of the nc35C>G point mutation site and at least 2, 3, 4, 5, 6, 7, 8, 9, 10, 11, 12, 15, 20, 25, 30, 40, or 50 nucleotides 3' of the nc35C>G point mutation site; and/or (ii) the probe strand comprises at least 2, 3, 4, 5, 6, 7, 8, 9, 10, 11, 12, 15, 20, 25, 30, 40, or 50 nucleotides 5' of the Ap residue and at least 2, 3, 4, 5, 6, 7, 8, 9, 10, 11, 12, 15, 20, 25, 30, 40, or 50 nucleotides 3' of the Ap residue.

Paragraph 27. The crosslinked nucleic acid molecule of Paragraph 26, wherein: (i) the target strand is at least or is at least about, is or is about, or between any or between any of about 12, 13, 14, 15, 16, 17, 18, 19, 20, 21, 22, 23, 24, 25, 26, 27, 28, 29, 30, 40, 50, 60, 70, 80, 90, or 100 nucleotides in length; (ii) the probe strand is less than or is less than about, is or is about, or between any or between any of about 100, 90, 80, 70, 60, 50, 40, 30, 29, 28, 27, 26, 25, 24, 23, 22, 21, 20, 19, 18, 17, 16, 15, 14, 13, or 12 nucleotides in length; and/or (iii) the hybridized nucleic acid molecule comprises a hybridized portion containing the Ap residue of the probe strand and the nc35C>G point mutation site of the target strand that is at least or at least about, is or is about, or between any or between any of about, 12, 13, 14, 15, 16, 17, 18, 19, 20, 21, 22, 23, 24, 25, 26, 27, 28, 29, 30, 40, 50, 60, 70, 80, 90, or 100 contiguous nucleotides in length.

Paragraph 28. The crosslinked nucleic acid molecule of Paragraph 27, wherein the hybridized portion containing the Ap residue of the probe strand and the nc35C>G point mutation site of the target strand, is at least or at least about, is or is about, or between any or between any of about 50%, 60%, 70%, 75%, 80%, 85%, 90%, 95%, 96%, 97%, 98%, or 99% complementary, or is 100% complementary, excluding the position of the Ap residue.

Paragraph 29. The crosslinked nucleic acid molecule of Paragraph 24, wherein the probe strand comprises, consists essentially of, or consists of SEQ ID NO: 3 or a fragment thereof comprising 5' GCXGG; SEQ ID NO: 4 or a fragment thereof comprising 5' GAXGG; SEQ ID NO: 5 or a fragment thereof comprising 5' GCXTG; SEQ ID NO: 6 or a fragment thereof comprising 5' GCXCG; SEQ ID NO: 7 or fragment thereof comprising 5' GCXAG; SEQ ID NO: 8 or a fragment thereof comprising 5' GCXGC; SEQ ID NO: 9 or a fragment thereof comprising 5' GCXCG; SEQ ID NO: 10 or a fragment thereof comprising 5' GCXAC; SEQ ID NO: 11 or a fragment thereof comprising 5' GCXTGG; SEQ ID NO: 12 of a fragment thereof comprising 5' GCXCGG; SEQ ID NO: 13 or a fragment thereof comprising 5' GCXGGG; or SEQ ID NO: 14 or a fragment thereof comprising 5' GCXAGG, wherein X is the Ap residue; optionally, wherein the probe strand comprises, consists essentially of, or consists of the sequence TTGGAGCTGCXAGGCGTAGGCA (SEQ ID NO: 14) or a fragment thereof comprising 5' GCXAGG.

Paragraph 30. The crosslinked nucleic acid molecule any one of Paragraphs 24 to 29, wherein the probe strand and/or the target strand comprises a terminal extension that is covalently attached to the 5' end, the 3' end, or both the 5' end and the 3' end of the strand; optionally, wherein the terminal extension is covalently attached to the 3' end of the strand and is selected from the group consisting of poly(dC)(3-33), poly(dG)(3-33), poly(dA)(3-33), poly(dT)(3-33), and poly(dN)(3-33), where N is any combination of 2'-deoxycytosine, 2'-deoxyguanosine, 2'-deoxyadenosine, thymine, an abase, inosine, xanthosine, 7-methylguanosine, dihydrouridine, or 5-methylcytidine.

EXAMPLES

The breadth and scope of the present disclosure should not be limited by any of the above-described exemplary embodiments, but should be defined only in accordance with the following claims and their equivalents.

Materials and Methods

DNA oligonucleotides were purchased from Integrated DNA Technologies (IDT, Coralville, IA), [γ-$^{32}$P]-ATP was purchased from Perkin Elmer Life Science, uracil DNA glycosylase was purchased from New England Biolabs (Ipswitch, MA), piperidine and acrylamide were purchased from Fisher Scientific (Waltham, MA). Sodium cyanoborohydride and other chemicals were purchased from Sigma-Aldrich (St. Louis, MO).

Cross-Linking Reactions.

DNA duplexes were generated by mixing a $^{32}$P-labeled 2'-deoxyuracil-containing oligonucleotide with a slight excess of the complementary strand in MOPS (50 mM, pH 7) containing NaCl (100 mM), warming the mixture to 90° C., followed by cooling to room temperature (24° C.). The Ap site was generated by treatment with uracil DNA glycosylase (UDG, 10 units/mL final concentration) in a solution composed of Tris-HCl (20 mM, pH 8 @25° C.), dithiothreitol (1 mM), EDTA (1 mM), MOPS (25 mM, pH 7) and NaCl (10 mM) for 40 min at 37° C. The DNA was ethanol precipitated and the duplex redissolved in a solution composed of sodium acetate (750 mM, pH 5.2) buffer containing NaCNBH$_3$ (200 mM). After incubation for 24 h at 37° C., the DNA was ethanol precipitated, redissolved in formamide loading buffer, and the products analyzed by electrophoresis on a denaturing 20% polyacrylamide gel. Following separation, the $^{32}$P-labeled oligonucleotides in the gel were visualized by phosphorimager analysis.

To verify that UDG treatment successfully generated Ap sites in the strands, the oligonucleotides were heated at 90° C. in a aqueous piperidine (100 mM) for 30 min to induce strand cleavage at the Ap site. The resulting DNA was dried in a Speed-Vac concentrator, redissolved in formamide loading buffer, and subjected to gel electrophoretic analysis. In the time-course experiments, aliquots of the reaction mixture were removed at selected time-points and frozen in dry ice prior to gel electrophoretic analysis. In the experiments involving mixtures of WT and mutant KRAS sequence, the $^{32}$P-labeled AP-containing probe strand was added to mixtures containing various ratios of WT and mutant KRAS sequences and processed as described above.

Footprinting experiments to pinpoint the location of cross-link attachment on the target strands were conducted as described previously (Johnson, 2013; Luce, 2001). Error bars reflect the standard deviation of the mean. Typical cross-link reactions were carried out in triplicate using a single batch of labeled probe. The cross-linking reactions in duplexes W and X were carried out in triplicate using at least four different batches of labeled probe (i.e. at least twelve separate cross-linking reactions). The slightly larger standard deviations observed for duplexes W and X are due to the fact that variation in cross-link yields between batches of labeled probe were somewhat greater than the variation in cross-link yields observed in triplicate repeats using a single batch of labeled probe. This may reflect batch-to-batch variations in salt impurities or specific activities associated with the labeled, AP-containing probe strands.

Human KRAS gene

SEQ ID NO: 15

ATGACTGAAT ATAAACTTGT GGTAGTTGGA GCTGGTGGCG

TAGGCAAGAG TGCCTTGACG ATACAGCTAA TTCAGAATCA

TTTTGTGGAC GAATATGATC CAACAATAGA GGATTCCTAC

AGGAAGCAAG TAGTAATTGA TGGAGAAACC TGTCTCTTGG

ATATTCTCGA CACAGCAGGT CAAGAGGAGT ACAGTGCAAT

GAGGGACCAG TACATGAGGA CTGGGGAGGG CTTTCTTTGT

GTATTTGCCA TAAATAATAC TAAATCATTT GAAGATATTC

ACCATTATAG AGAACAAATT AAAAGAGTTA AGGACTCTGA

AGATGTACCT ATGGTCCTAG TAGGAAATAA ATGTGATTTG

CCTTCTAGAA CAGTAGACAC AAAACAGGCT CAGGACTTAG

CAAGAAGTTA TGGAATTCCT TTTATTGAAA CATCAGCAAA

GACAAGACAG GGTGTTGATG ATGCCTTCTA TACATTAGTT

CGAGAAATTC GAAAACATAA AGAAAGATG AGLAAAGATG

GTAAAAAGAA GAAAAAGAAG TCAAAGACAA AGTGTGTAAT

TATGTAA

---

What is claimed is:

1. A method of detecting the presence or absence of a dG residue at a particular position in a nucleic acid target strand (target dG), the method comprising incubating a hybridized double-stranded nucleic acid molecule comprising:
   (i) a target strand; and
   (ii) an at least partially complementary probe strand that comprises an abasic (Ap) residue,
   wherein the Ap residue of the probe strand is at a position that is immediately 3' adjacent to the nucleotide residue in the probe strand that is directly opposite to the particular position in the target strand where the presence or absence of the target dG residue is to be detected;
   (a) wherein in the hybridized nucleic acid molecule, the segment immediately 5' and 3' flanking the Ap residue, including the Ap residue, in the probe strand comprises a mispairing between the nucleotide residue immediately 5' of the Ap residue on the probe strand and the target dG, and wherein the nucleotide residue immediately 5' of the Ap residue of the probe strand is A, T, or G, or
   (b) wherein in the hybridized nucleic acid molecule, the segment immediately 5' and 3' flanking the Ap residue, including the Ap residue, in the probe strand comprises a sequence that forms a bulge in the probe strand, and wherein the probe strand sequence that forms a bulge in the probe strand comprises an insertion of a nucleotide immediately 3' adjacent to the Ap residue in the probe strand that does not have a corresponding residue in the target strand sequence; and
   wherein the incubation occurs under conditions that allow for a covalent cross link to form between the Ap residue in the probe strand and the target dG residue in the target strand, if present,
   and detecting whether crosslinking of the target and probe strands occurred,
   thereby detecting the presence or absence of the target dG residue at the particular position in the target strand.

2. The method of detecting the presence or absence of a dG residue at a particular position in a nucleic acid target strand (target dG) claim 1, wherein the target strand comprises genomic or mitochondrial DNA.

3. The method of detecting the presence or absence of a dG residue at a particular position in a nucleic acid target strand (target dG) of claim 1, wherein a target dG is present at the particular position in the target strand and a covalent crosslink forms between the Ap residue in the probe strand and the target dG in the target strand and the method detects the presence of the dG residue in the target strand.

4. The method of detecting the presence or absence of a dG residue at a particular position in a nucleic acid target strand (target dG) of claim 1, wherein a target dG is not present at the particular position in the target strand and a covalent crosslink does not form between the Ap residue in the probe strand and a target dG and the method detects the absence of a dG residue in the target strand.

5. The method of detecting the presence or absence of a dG residue at a particular position in a nucleic acid target strand (target dG) of claim 1,
   (a) wherein in the hybridized nucleic acid molecule, the segment immediately 5' and 3' flanking the Ap residue, including the Ap residue, in the probe strand comprises a mispairing between the nucleotide residue immediately 5' of the Ap residue on the probe strand and the target dG, and wherein the nucleotide residue immediately 5' of the Ap residue of the probe strand is A, T, or G.

6. The method of detecting the presence or absence of a dG residue at a particular position in a nucleic acid target strand (target dG) of claim 1,
   (b) wherein in the hybridized nucleic acid molecule, the segment immediately 5' and 3' flanking the Ap residue, including the Ap residue, in the probe strand comprises a sequence that forms a bulge in the probe strand, and wherein the probe strand sequence that forms a bulge in the probe strand comprises an insertion of a nucleotide immediately 3' adjacent to the Ap residue in the probe strand that does not have a corresponding residue in the target strand sequence.

7. The method of detecting the presence or absence of a dG residue at a particular position in a nucleic acid target strand (target dG) of claim 6, wherein the insertion is of an A.

8. A method of detecting a mutation in a wild-type sequence, the method comprising detecting the presence or absence of a target dG residue at a particular position in a target strand (target dG) according to the method of claim 1.

9. The method of detecting a mutation in a wild-type sequence of claim 8, wherein the target dG residue is present at the particular position in the target strand and the mutation comprises a T→G, A→G, or C→G mutation; or wherein the dG residue is absent at the particular position in the target strand and the mutation comprises an G→T, G→A, or G→C mutation.

10. The method of detecting a mutation in a wild-type sequence of claim 8, wherein the presence or absence of the dG residue represents a disease relevant mutation.

11. The method of detecting a mutation in a wild-type sequence claim 10, wherein the disease is cancer.

12. A method of detecting the presence of a dG residue in a nucleic acid strand, the method comprising incubating a hybridized, double-stranded nucleic acid molecule that comprises:
   (i) a target strand comprising a dG residue to be detected (target dG); and
   (ii) an at least partially complementary probe strand that comprises an abasic (Ap) residue,
   wherein, in the hybridized molecule, the Ap residue of the probe strand is at a position immediately 3' adjacent to the nucleotide residue in the probe strand that is directly opposite of the target dG residue in the target strand;
   (a) wherein in the hybridized nucleic acid molecule, the segment immediately 5' and 3' flanking the Ap residue, including the Ap residue, in the probe strand comprises a mispairing between the nucleotide residue immediately 5' of the Ap residue on the probe strand and the target dG, and wherein the nucleotide residue immediately 5' of the Ap residue of the probe strand is A, T, or G, or
   (b) wherein in the hybridized nucleic acid molecule, the segment immediately 5' and 3' flanking the Ap residue, including the Ap residue, in the probe strand comprises a sequence that forms a bulge in the probe strand, and wherein the probe strand sequence that forms a bulge in the probe strand comprises an insertion of a nucleotide immediately 3' adjacent to the Ap residue in the probe strand that does not have a corresponding residue in the target strand sequence; and
   wherein incubation occurs under conditions that allow for a covalent cross link to form between the Ap residue in the probe strand and the target dG residue in the target strand,
   and detecting covalent crosslinking of the probe strand and target strand between the Ap residue in the probe strand and the target dG,
   thus detecting the presence of the target dG residue in the target strand.

13. The method of claim 12, wherein the probe strand, the target strand, or both the probe strand and the target strand, is a DNA molecule.

14. The method of claim 12, wherein the target strand comprises genomic or mitochondrial DNA.

15. The method of detecting the presence of a dG residue in a nucleic acid strand of claim 12,
   (a) wherein in the hybridized nucleic acid molecule, the segment immediately 5' and 3' flanking the Ap residue, including the Ap residue, in the probe strand comprises a mispairing between the nucleotide residue immediately 5' of the Ap residue on the probe strand and the target dG, and wherein the nucleotide residue immediately 5' of the Ap residue of the probe strand is A, T, or G.

16. The method of detecting the presence of a dG residue in a nucleic acid strand of claim 12,
   (b) wherein in the hybridized nucleic acid molecule, the segment immediately 5' and 3' flanking the Ap residue, including the Ap residue, in the probe strand comprises a sequence that forms a bulge in the probe strand, and wherein the probe strand sequence that forms a bulge in the probe strand comprises an insertion of a nucleotide immediately 3' adjacent to the Ap residue in the probe strand that does not have a corresponding residue in the target strand sequence.

17. The method of detecting the presence of a dG residue in a nucleic acid strand of claim 16, wherein the insertion is of an A.

* * * * *

SEQUENCE LISTING

<160> NUMBER OF SEQ ID NOS: 15

<210> SEQ ID NO 1
<211> LENGTH: 21
<212> TYPE: DNA
<213> ORGANISM: Homo sapiens

<400> SEQUENCE: 1
tgcctacgcc agcagctcca a      21

<210> SEQ ID NO 2
<211> LENGTH: 21
<212> TYPE: DNA
<213> ORGANISM: Homo sapiens

<400> SEQUENCE: 2
tgcctacgcc accagctcca a      21

```
<210> SEQ ID NO 3
<211> LENGTH: 21
<212> TYPE: DNA
<213> ORGANISM: Artificial Sequence
<220> FEATURE:
<223> OTHER INFORMATION: Synthetic Probe 1
<220> FEATURE:
<221> NAME/KEY: misc_feature
<223> OTHER INFORMATION: n is an abasic nucleic acid residue (Ap)
<220> FEATURE:
<221> NAME/KEY: misc_feature
<222> LOCATION: (11)..(11)
<223> OTHER INFORMATION: n is a, c, g, or t

<400> SEQUENCE: 3
ttggagctgc nggcgtaggc a                                              21

<210> SEQ ID NO 4
<211> LENGTH: 21
<212> TYPE: DNA
<213> ORGANISM: Artificial Sequence
<220> FEATURE:
<223> OTHER INFORMATION: Synthetic Probe 2
<220> FEATURE:
<221> NAME/KEY: misc_feature
<223> OTHER INFORMATION: n is an abasic nucleic acid residue (Ap)
<220> FEATURE:
<221> NAME/KEY: misc_feature
<222> LOCATION: (11)..(11)
<223> OTHER INFORMATION: n is a, c, g, or t

<400> SEQUENCE: 4
ttggagctga nggcgtaggc a                                              21

<210> SEQ ID NO 5
<211> LENGTH: 21
<212> TYPE: DNA
<213> ORGANISM: Artificial Sequence
<220> FEATURE:
<223> OTHER INFORMATION: Synthetic Probe 3
<220> FEATURE:
<221> NAME/KEY: misc_feature
<223> OTHER INFORMATION: n is an abasic nucleic acid residue (Ap)
<220> FEATURE:
<221> NAME/KEY: misc_feature
<222> LOCATION: (11)..(11)
<223> OTHER INFORMATION: n is a, c, g, or t

<400> SEQUENCE: 5
ttggagctgc ntgcgtaggc a                                              21

<210> SEQ ID NO 6
<211> LENGTH: 21
<212> TYPE: DNA
<213> ORGANISM: Artificial Sequence
<220> FEATURE:
<223> OTHER INFORMATION: Synthetic Probe 4
<220> FEATURE:
<221> NAME/KEY: misc_feature
<223> OTHER INFORMATION: n is an abasic nucleic acid residue (Ap)
<220> FEATURE:
<221> NAME/KEY: misc_feature
<222> LOCATION: (11)..(11)
<223> OTHER INFORMATION: n is a, c, g, or t

<400> SEQUENCE: 6
ttggagctgc ncgcgtaggc a                                              21

<210> SEQ ID NO 7
<211> LENGTH: 21
```

```
<212> TYPE: DNA
<213> ORGANISM: Artificial Sequence
<220> FEATURE:
<223> OTHER INFORMATION: Synthetic Probe 5
<220> FEATURE:
<221> NAME/KEY: misc_feature
<223> OTHER INFORMATION: n is an abasic nucleic acid residue (Ap)
<220> FEATURE:
<221> NAME/KEY: misc_feature
<222> LOCATION: (11)..(11)
<223> OTHER INFORMATION: n is a, c, g, or t

<400> SEQUENCE: 7
ttggagctgc nagcgtaggc a                                             21

<210> SEQ ID NO 8
<211> LENGTH: 20
<212> TYPE: DNA
<213> ORGANISM: Artificial Sequence
<220> FEATURE:
<223> OTHER INFORMATION: Synthetic Probe 6
<220> FEATURE:
<221> NAME/KEY: misc_feature
<223> OTHER INFORMATION: n is an abasic nucleic acid residue (Ap)
<220> FEATURE:
<221> NAME/KEY: misc_feature
<222> LOCATION: (11)..(11)
<223> OTHER INFORMATION: n is a, c, g, or t

<400> SEQUENCE: 8
ttggagctgc ngcgtaggca                                               20

<210> SEQ ID NO 9
<211> LENGTH: 19
<212> TYPE: DNA
<213> ORGANISM: Artificial Sequence
<220> FEATURE:
<223> OTHER INFORMATION: Synthetic Probe 7
<220> FEATURE:
<221> NAME/KEY: misc_feature
<223> OTHER INFORMATION: n is an abasic nucleic acid residue (Ap)
<220> FEATURE:
<221> NAME/KEY: misc_feature
<222> LOCATION: (11)..(11)
<223> OTHER INFORMATION: n is a, c, g, or t

<400> SEQUENCE: 9
ttggagctgc ncgtaggca                                                19

<210> SEQ ID NO 10
<211> LENGTH: 20
<212> TYPE: DNA
<213> ORGANISM: Artificial Sequence
<220> FEATURE:
<223> OTHER INFORMATION: Synthetic Probe 8
<220> FEATURE:
<221> NAME/KEY: misc_feature
<223> OTHER INFORMATION: n is an abasic nucleic acid residue (Ap)
<220> FEATURE:
<221> NAME/KEY: misc_feature
<222> LOCATION: (11)..(11)
<223> OTHER INFORMATION: n is a, c, g, or t

<400> SEQUENCE: 10
ttggagctgc nacgtaggca                                               20

<210> SEQ ID NO 11
<211> LENGTH: 22
<212> TYPE: DNA
<213> ORGANISM: Artificial Sequence
<220> FEATURE:
```

```
<223> OTHER INFORMATION: Synthetic Probe 9
<220> FEATURE:
<221> NAME/KEY: misc_feature
<223> OTHER INFORMATION: n is an abasic nucleic acid residue (Ap)
<220> FEATURE:
<221> NAME/KEY: misc_feature
<222> LOCATION: (11)..(11)
<223> OTHER INFORMATION: n is a, c, g, or t

<400> SEQUENCE: 11
ttggagctgc ntggcgtagg ca                                          22

<210> SEQ ID NO 12
<211> LENGTH: 22
<212> TYPE: DNA
<213> ORGANISM: Artificial Sequence
<220> FEATURE:
<223> OTHER INFORMATION: Synthetic Probe 10
<220> FEATURE:
<221> NAME/KEY: misc_feature
<223> OTHER INFORMATION: n is an abasic nucleic acid residue (Ap)
<220> FEATURE:
<221> NAME/KEY: misc_feature
<222> LOCATION: (11)..(11)
<223> OTHER INFORMATION: n is a, c, g, or t

<400> SEQUENCE: 12
ttggagctgc ncggcgtagg ca                                          22

<210> SEQ ID NO 13
<211> LENGTH: 22
<212> TYPE: DNA
<213> ORGANISM: Artificial Sequence
<220> FEATURE:
<223> OTHER INFORMATION: Synthetic Probe 11
<220> FEATURE:
<221> NAME/KEY: misc_feature
<223> OTHER INFORMATION: n is an abasic nucleic acid residue (Ap)
<220> FEATURE:
<221> NAME/KEY: misc_feature
<222> LOCATION: (11)..(11)
<223> OTHER INFORMATION: n is a, c, g, or t

<400> SEQUENCE: 13
ttggagctgc ngggcgtagg ca                                          22

<210> SEQ ID NO 14
<211> LENGTH: 22
<212> TYPE: DNA
<213> ORGANISM: Artificial Sequence
<220> FEATURE:
<223> OTHER INFORMATION: Synthetic Probe 12
<220> FEATURE:
<221> NAME/KEY: misc_feature
<223> OTHER INFORMATION: n is an abasic nucleic acid residue (Ap)
<220> FEATURE:
<221> NAME/KEY: misc_feature
<222> LOCATION: (11)..(11)
<223> OTHER INFORMATION: n is a, c, g, or t

<400> SEQUENCE: 14
ttggagctgc naggcgtagg ca                                          22

<210> SEQ ID NO 15
<211> LENGTH: 567
<212> TYPE: DNA
<213> ORGANISM: Homo sapiens

<400> SEQUENCE: 15
atgactgaat ataaacttgt ggtagttgga gctggtggcg taggcaagag tgccttgacg    60
```

```
atacagctaa ttcagaatca ttttgtggac gaatatgatc caacaataga ggattcctac    120
aggaagcaag tagtaattga tggagaaacc tgtctcttgg atattctcga cacagcaggt    180
caagaggagt acagtgcaat gagggaccag tacatgagga ctggggaggg ctttctttgt    240
gtatttgcca taaataatac taaatcattt gaagatattc accattatag agaacaaatt    300
aaaagagtta aggactctga agatgtacct atggtcctag taggaaataa atgtgatttg    360
ccttctagaa cagtagacac aaaacaggct caggacttag caagaagtta tggaattcct    420
tttattgaaa catcagcaaa gacaagacag ggtgttgatg atgccttcta tacattagtt    480
cgagaaattc gaaaacataa agaaaagatg agcaaagatg gtaaaaagaa gaaaaagaag    540
tcaaagacaa agtgtgtaat tatgtaa                                        567
```